(12) United States Patent
Adachi et al.

(10) Patent No.: US 10,260,992 B2
(45) Date of Patent: Apr. 16, 2019

(54) ABNORMALITY DIAGNOSTIC DEVICE FOR A VARIABLE COMPRESSION RATIO MECHANISM

(71) Applicant: TOYOTA JIDOSHA KABUSHIKI KAISHA, Toyota-shi, Aichi-ken (JP)

(72) Inventors: Noriyasu Adachi, Numazu (JP); Tomoya Ota, Nagoya (JP); Hiroshi Watanabe, Shizuoka-ken (JP); Yoshio Ueno, Izunokuni (JP); Takayoshi Kawai, Susono (JP); Aya Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 44 days.

(21) Appl. No.: 15/676,093

(22) Filed: Aug. 14, 2017

(65) Prior Publication Data

US 2018/0052077 A1 Feb. 22, 2018

(30) Foreign Application Priority Data

Aug. 16, 2016 (JP) .................. 2016-159652
Mar. 29, 2017 (JP) .................. 2017-065533

(51) Int. Cl.
*F02D 43/00* (2006.01)
*G01M 15/04* (2006.01)
(Continued)

(52) U.S. Cl.
CPC ......... *G01M 15/046* (2013.01); *F02B 75/045* (2013.01); *F02B 77/083* (2013.01);
(Continued)

(58) Field of Classification Search
CPC ... G01M 15/046; F02B 77/083; F02B 75/056; F02D 41/1497; F02D 41/0087;
(Continued)

(56) References Cited

U.S. PATENT DOCUMENTS

2011/0093186 A1* 4/2011 Hagari ............... F02D 13/0226
701/111
2015/0233309 A1* 8/2015 Tanaka .................. F02D 15/04
123/48 C
(Continued)

FOREIGN PATENT DOCUMENTS

JP S62-50637 A 3/1987
JP 2010-174757 A 8/2010
(Continued)

*Primary Examiner* — Marguerite McMahon
(74) *Attorney, Agent, or Firm* — Hunton Andrews Kurth LLP

(57) ABSTRACT

An object is to carry out an abnormality diagnosis for a variable compression ratio mechanism without adding any special hardware configuration for estimating a compression ratio. An abnormality diagnostic device for a variable compression ratio mechanism adapted to be applied to an internal combustion engine comprises a controller configured to calculate a predetermined rotational speed difference which is a rotational speed difference, between an engine rotational speed at a predetermined crank angle before or after compression top dead center and an engine rotational speed in the vicinity of the compression top dead center for a predetermined cylinder at the time of carrying out fuel cut processing, set a reference range of the predetermined rotational speed difference, and make a diagnosis that abnormality has occurred in the variable compression ratio mechanism when the predetermined rotational speed difference is out of the reference range.

5 Claims, 11 Drawing Sheets

(51) Int. Cl.
<table>
<tr><td>F02B 75/04</td><td>(2006.01)</td></tr>
<tr><td>F02D 15/02</td><td>(2006.01)</td></tr>
<tr><td>F02D 41/00</td><td>(2006.01)</td></tr>
<tr><td>F02D 41/14</td><td>(2006.01)</td></tr>
<tr><td>F02D 41/22</td><td>(2006.01)</td></tr>
<tr><td>F02B 77/08</td><td>(2006.01)</td></tr>
<tr><td>F02D 41/12</td><td>(2006.01)</td></tr>
</table>

(52) U.S. Cl.
CPC ......... *F02D 15/02* (2013.01); *F02D 41/0087* (2013.01); *F02D 41/1497* (2013.01); *F02D 41/221* (2013.01); *F02D 41/123* (2013.01); *F02D 2200/101* (2013.01)

(58) Field of Classification Search
CPC .. F02D 15/02; F02D 41/221; F02D 2200/101; F02D 41/123
USPC ............................................ 123/48 B, 198 F
See application file for complete search history.

(56) References Cited

U.S. PATENT DOCUMENTS

| | | | |
|---|---|---|---|
| 2015/0354488 A1* | 12/2015 | Hiyoshi | ................ F02D 41/123 123/48 B |
| 2016/0177997 A1 | 6/2016 | Ezaki et al. | |
| 2017/0114739 A1* | 4/2017 | Glugla | ................... F02B 75/04 |

FOREIGN PATENT DOCUMENTS

| | | |
|---|---|---|
| JP | 2015-094304 A | 5/2015 |
| JP | 2016-118180 A | 6/2016 |
| JP | 2016-118181 A | 6/2016 |
| WO | 2016/103019 A1 | 6/2016 |

\* cited by examiner

[FIG. 1]
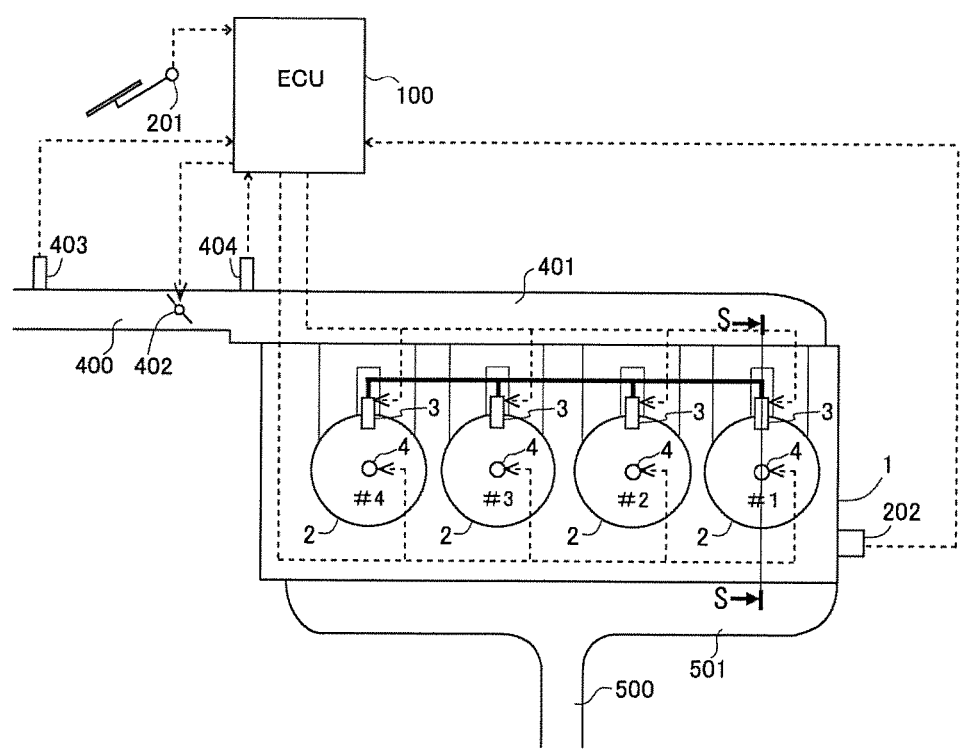

[FIG. 2]
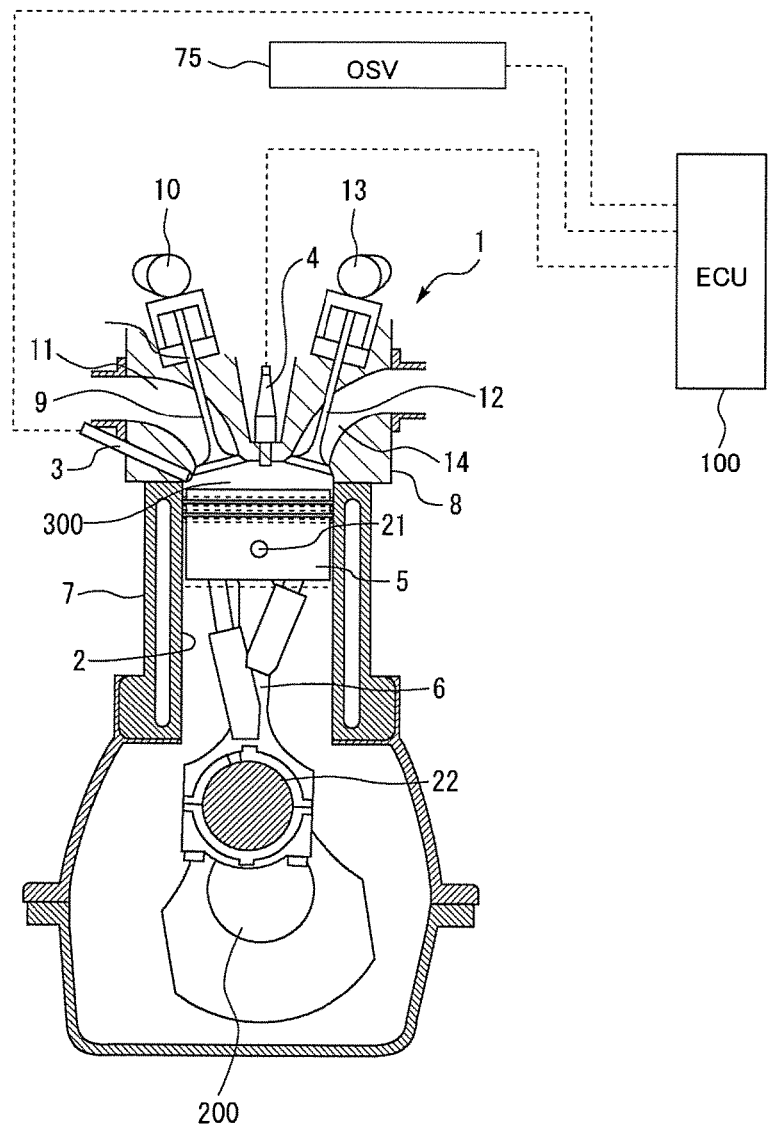

[FIG. 3]
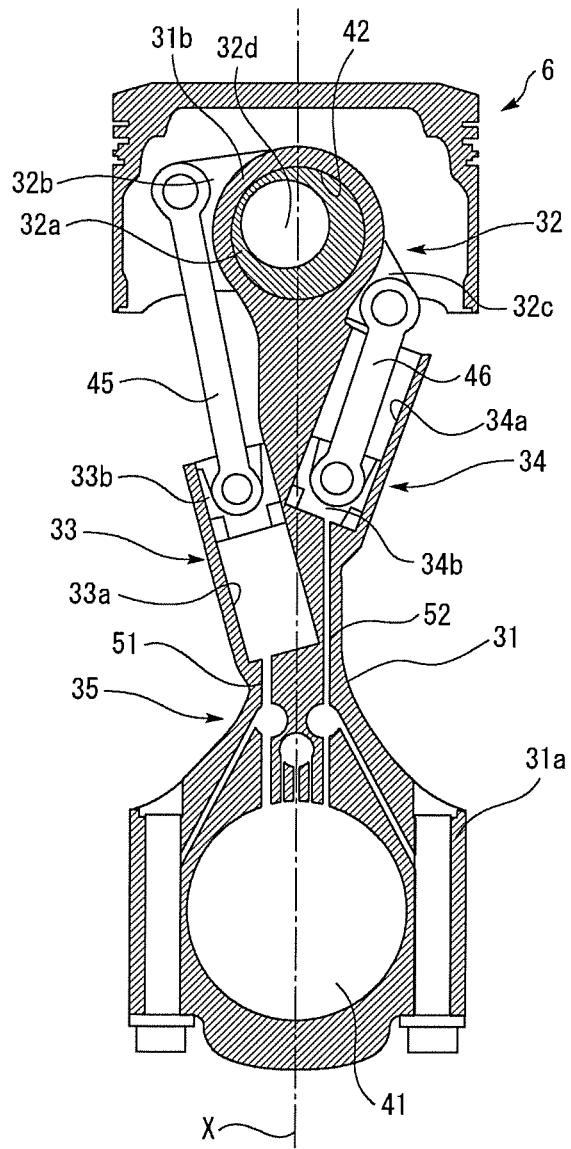

[FIG. 4]
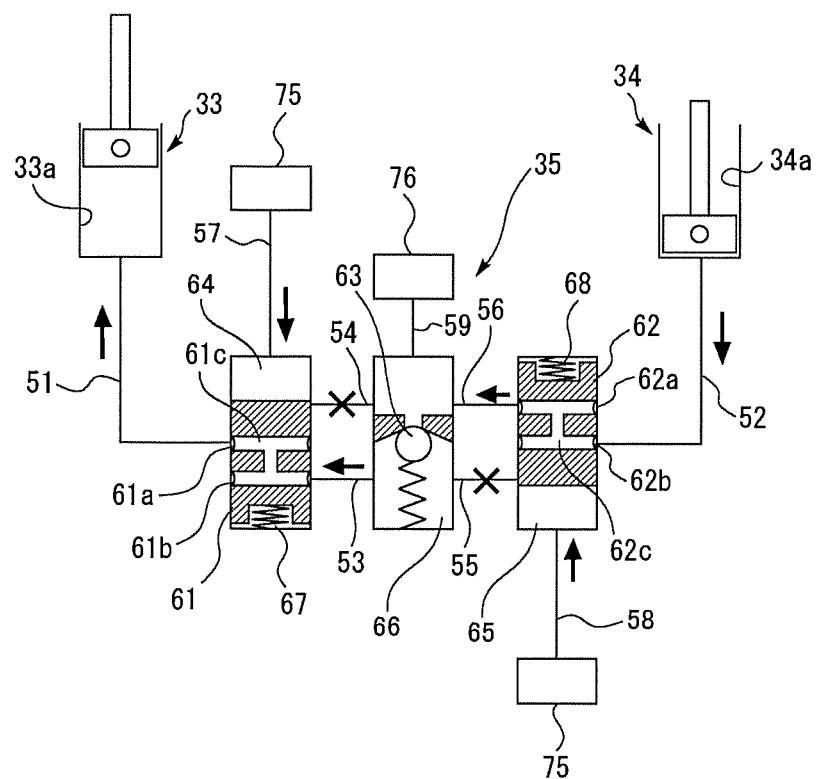

[FIG. 5]
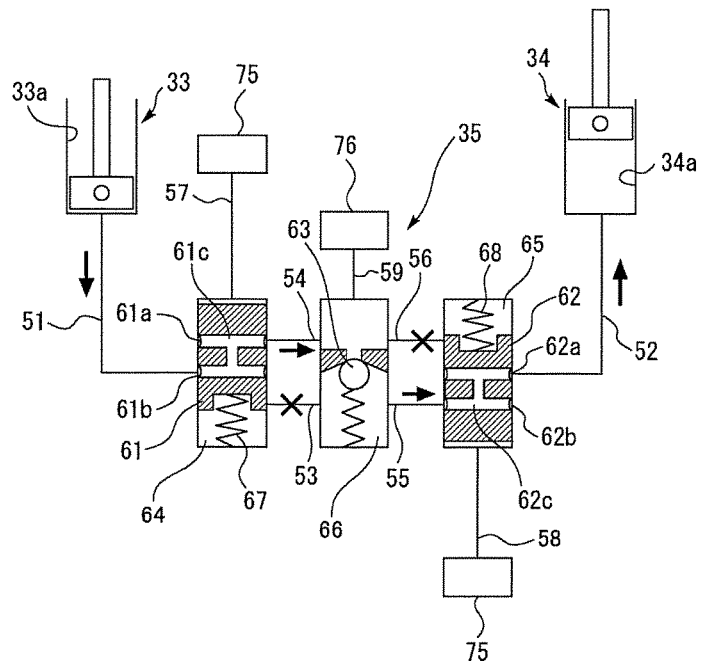
[FIG. 6]
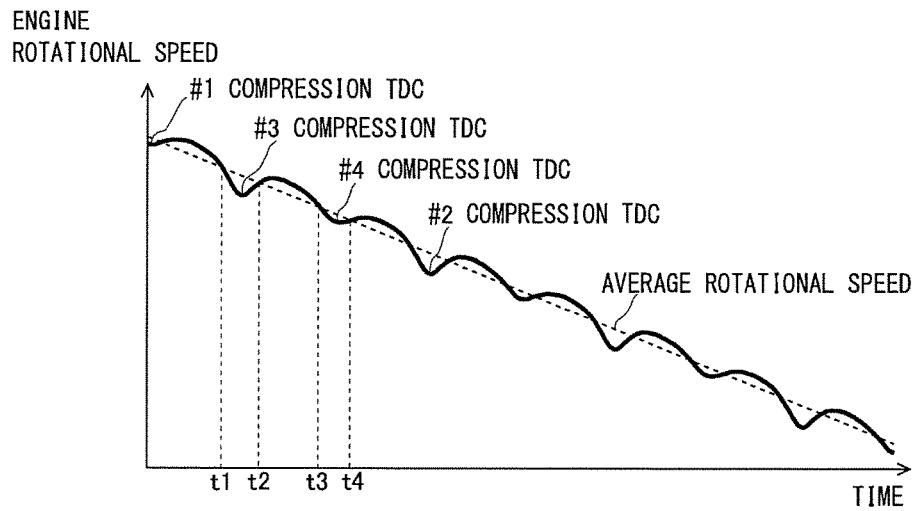

[FIG. 7]
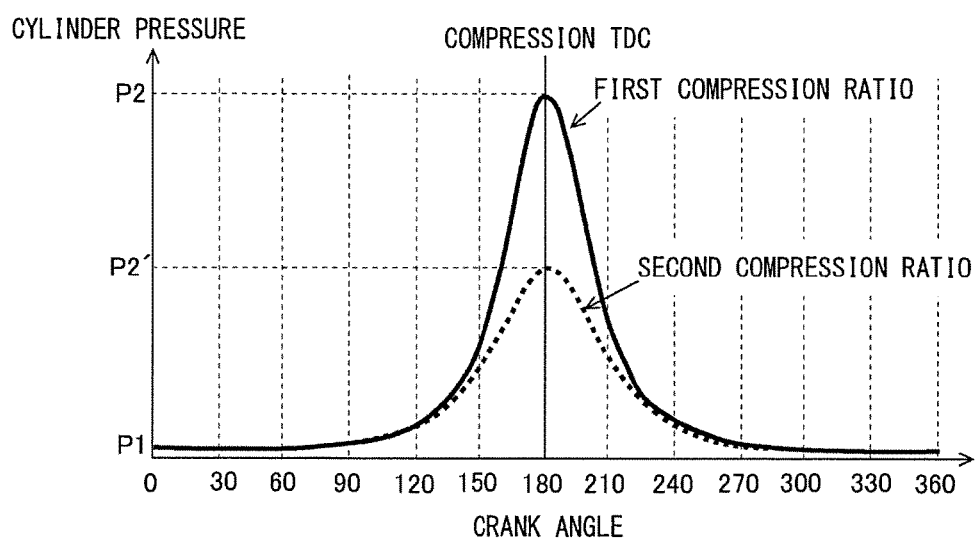

[FIG. 8]
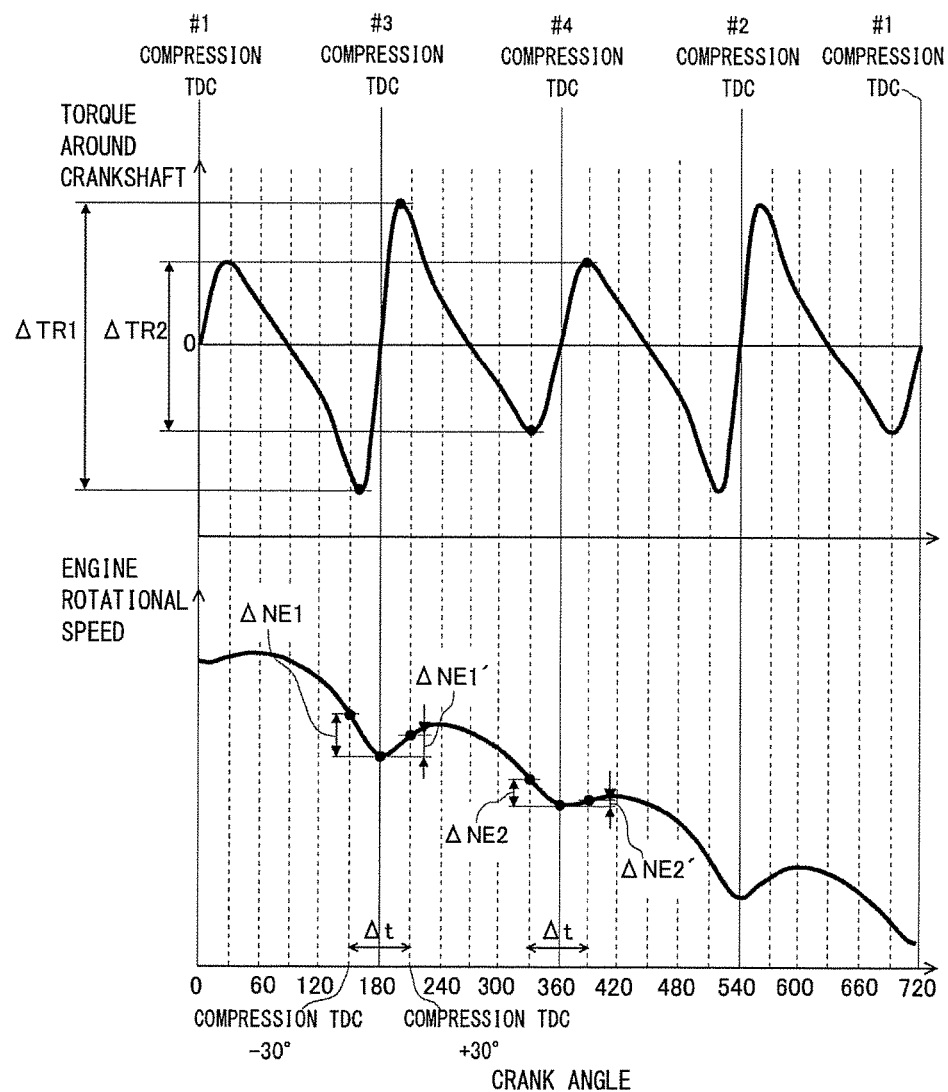

[FIG. 9]
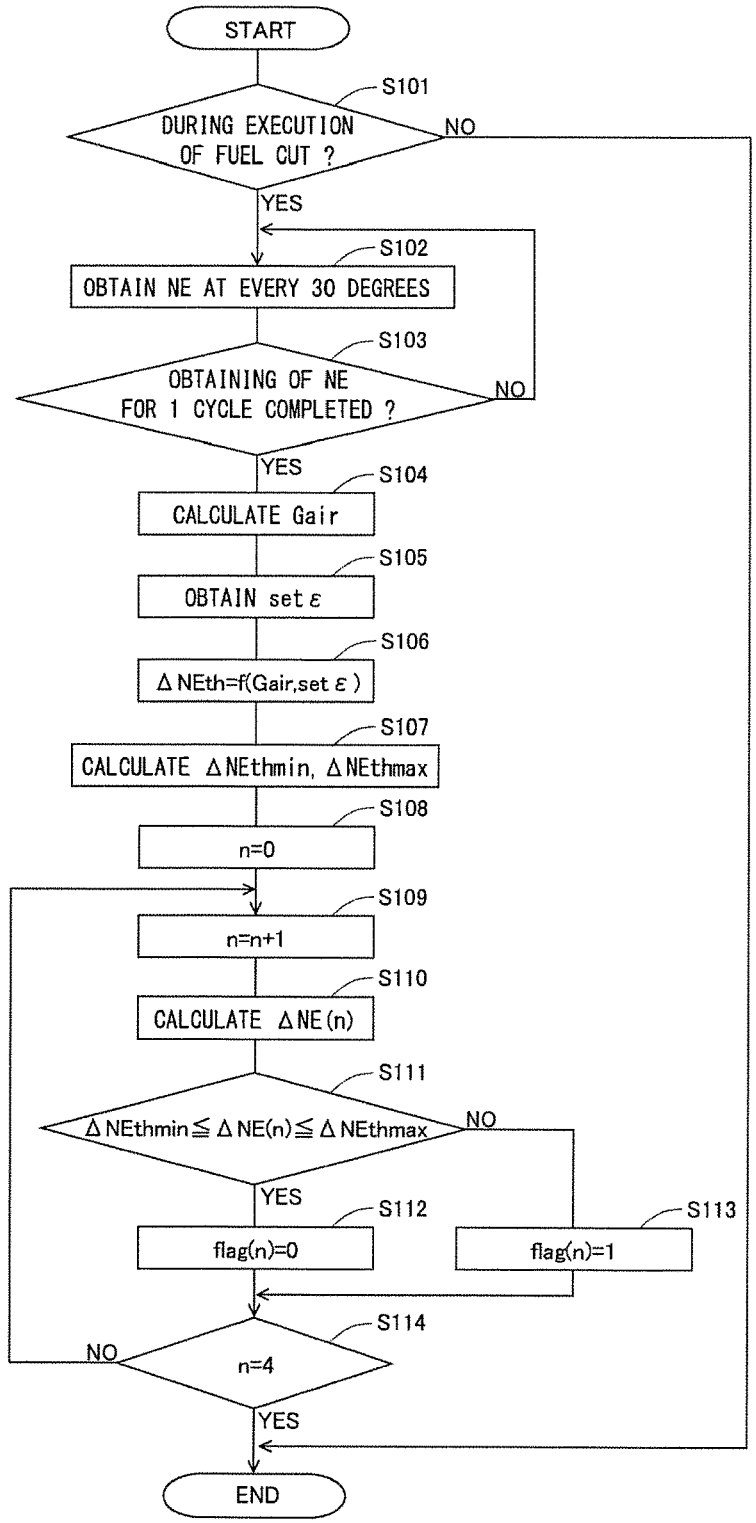

[FIG. 10]
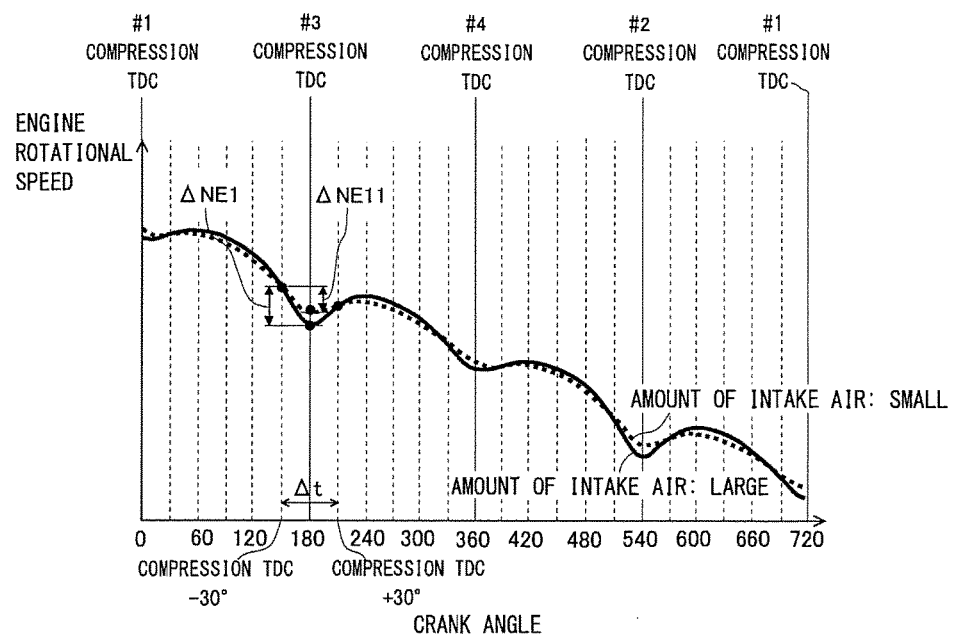
[FIG. 11]
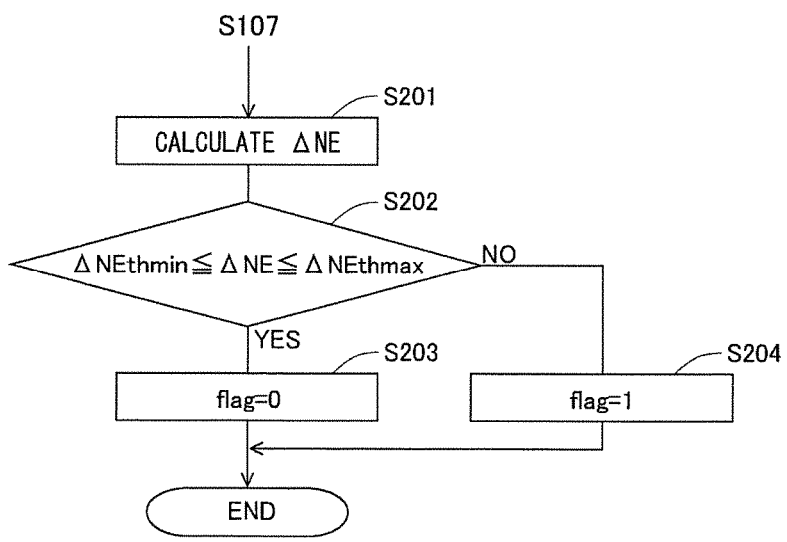

[FIG. 12]
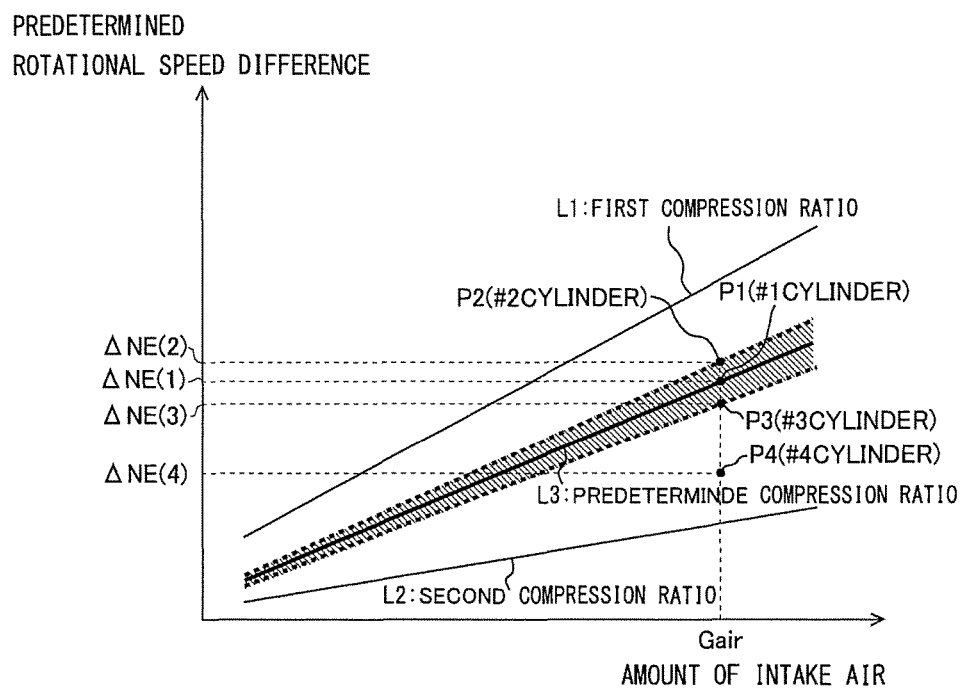

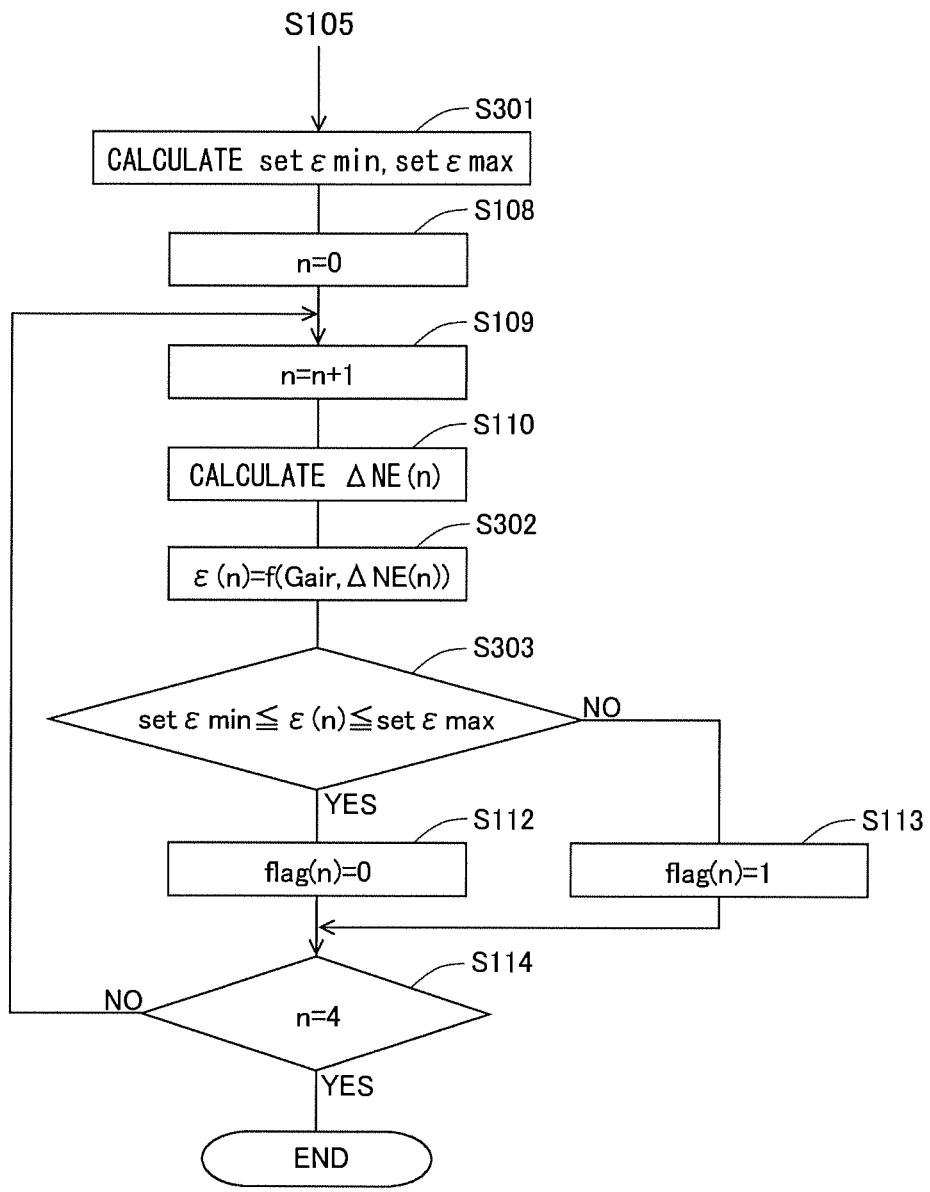
[FIG. 13]

ABNORMALITY DIAGNOSTIC DEVICE FOR A VARIABLE COMPRESSION RATIO MECHANISM

CROSS-REFERENCE TO RELATED APPLICATIONS

This application claims priority to Japanese Patent Application No. 2016-159652 filed on Aug. 16, 2016, and Japanese Patent Application No. 2017-065533 filed on Mar. 29, 2017, the entire contents of which are incorporated by reference.

BACKGROUND

Technical Field

The present disclosure relates to an abnormality diagnostic device for a variable compression ratio mechanism.

Description of the Related Art

In the past, there has been known an internal combustion engine which is provided with a variable compression ratio mechanism capable of changing a compression ratio. For example, in patent literature 1, there is disclosed a technology of making the compression ratio change by changing the rotational position of a control shaft. In addition, in patent literatures 2 and 3, there are also disclosed technologies with respect to a variable-length connecting rod in which an effective length thereof is made to change, for changing the compression ratio.

Moreover, there is also disclosed a procedure for determining a cylinder which is in a failed state, based on an engine rotational acceleration during combustion in each cylinder of an internal combustion engine (refer to patent literature 4).

CITATION LIST

Patent Literature

Patent Literature 1: Japanese Patent Application Laid-Open No. 2010-174757
Patent Literature 2: Japanese Patent Application Laid-Open No. 2016-118181
Patent Literature 3: Japanese Patent Application Laid-Open No. 2016-118180
Patent Literature 4: Japanese Patent Application Laid-Open No. S62-050637
Patent Literature 5: Japanese Patent Application Laid-Open No. 2015-094304

SUMMARY

In an internal combustion engine comprising a variable compression ratio mechanism, in cases where abnormality occurs in the variable compression ratio mechanism so that the mechanism is put in a state where the change of a compression ratio can not be made, it becomes difficult to suitably adjust the compression ratio according to the operating state of the internal combustion engine. Accordingly, it is known in the conventional technologies that the abnormality in the variable compression ratio mechanism is detected by calculating the compression ratio using a cylinder pressure sensor, but when the cylinder pressure sensor is added in order to calculate the compression ratio, costs will increase and the design degree of freedom of peripheral parts will be affected.

On the other hand, in the conventional technology (patent literature 1) in which the compression ratio is estimated without depending on a cylinder pressure sensor, the compression ratio is estimated based on a holding torque of the control shaft which changes according to the cylinder pressure. In cases where the compression ratio is tried to be estimated based on this technology, the internal combustion engine will need to be provided with the control shaft of which the holding torque changes according to the cylinder pressure, and hence, the degree of design freedom of the internal combustion engine will decrease.

In addition, in the conventional technology (patent literature 4), it can be determined whether a cylinder is in a failed state, but it can not be determined whether the failed state of the cylinder depends on an abnormality of the compression ratio or on other factors.

The present disclosure has been made in view of the problems as referred to above, and the object of the disclosure is to provide a technology in which an abnormality diagnosis for a variable compression ratio mechanism can be carried out, without adding any special hardware configuration for estimating a compression ratio.

Solution to Problem

In the present disclosure, in order to solve the aforementioned problems, attention has been focused on a rotational speed difference between an engine rotational speed in the vicinity of compression top dead center and that at a predetermined crank angle at the time of carrying out fuel cut processing. Hereinafter, unless otherwise specified, the rotational speed difference in the engine rotational speed is simply referred to as a "rotational speed difference". The engine rotational speed (i.e., the rotational angular velocity of a crankshaft) tends to be decided by a torque to the rotation of the crankshaft, and the torque tends to be decided by a cylinder pressure in the internal combustion engine. Stated in another way, there is a tendency that according to the cylinder pressure, the torque to the rotation of the crankshaft changes, and in addition, the engine rotational speed changes. In other words, the rotational speed difference may occur according to the cylinder pressures in the vicinity of the compression top dead center and at the predetermined crank angle, and hence, when attention is focused on the rotational speed difference, it can be diagnosed whether abnormality has occurred in the mechanical compression ratio of the internal combustion engine which affects the cylinder pressure, i.e., it can be diagnosed whether abnormality has occurred in the variable compression ratio mechanism.

Here, assuming when combustion is being carried out in a cylinder, the influence due to the state of the combustion becomes dominant with respect to the rotational speed difference which may be generated by the cylinder pressure in the internal combustion engine, and it is not easy to determine from the rotational speed difference in an accurate manner whether abnormality has occurred in the mechanical compression ratio of the internal combustion engine. In contrast to this, when fuel cut processing is carried out, the influence due to the combustion state is eliminated, so that the cylinder pressure in the compression and expansion strokes mainly becomes a pressure based on an amount of intake air and the mechanical compression ratio. In other words, the rotational speed difference between the rotational speeds in the vicinity of the compression top dead center and at the predetermined crank angle at the time of carrying out fuel cut processing will be affected mainly by the influence of the amount of intake air and the mechanical compression ratio.

In addition, at the time of carrying out fuel cut processing, assuming that the cylinder pressure is represented by P; the volume of a cylinder in the internal combustion engine is represented by V; and a polytropic exponent is represented by n; it results in that $PV^n$ is constant. Then, because the polytropic exponent n generally becomes a value larger than 1, the ratio of the amount of change of the cylinder pressure P with respect to the amount of change of the volume V of the cylinder becomes larger, as the volume V of the cylinder becomes smaller. Moreover, the rate of change of the volume V of the cylinder in the compression stroke goes smaller from a substantially intermediate position between the top dead center and the bottom dead center to the top dead center, and becomes zero in the top dead center. Further, the rate of change of the volume V of the cylinder in the expansion stroke goes larger from the top dead center to the substantially intermediate position between the top dead center and the bottom dead center. In view of these phenomena, at the time of carrying out fuel cut processing, the rate of change of the cylinder pressure P will become large at a predetermined crank angle before or after the compression top dead center. Accordingly, the pressure difference between the cylinder pressure at such a predetermined crank angle before or after the compression top dead center and the cylinder pressure in the vicinity of the compression top dead center will become relatively large, and further, the pressure difference becomes larger, as the mechanical compression ratio is higher.

From the above, in view of the fact that the rotational speed difference may occur according to the cylinder pressure, and that the pressure difference between the cylinder pressure at the predetermined crank angle before or after the compression top dead center and the cylinder pressure in the vicinity of the compression top dead center becomes relatively large, the rotational speed difference between the engine rotational speed at the predetermined crank angle before or after the compression top dead center and the engine rotational speed in the vicinity of the compression top dead center becomes relatively large. Then, in the rotational speed difference defined in this manner, the influence of the mechanical compression ratio with respect to the rotational speed difference, in which the rotational speed difference becomes larger as the mechanical compression ratio is higher, may appear clearly, and hence, it can be determined from the rotational speed difference whether abnormality has occurred in the mechanical compression ratio.

Accordingly, the present disclosure calculates the rotational speed difference between the engine rotational speed in the vicinity of the compression top dead center and that at the predetermined crank angle at the time of carrying out fuel cut processing, and performs an abnormality diagnosis of the variable compression ratio mechanism based on the rotational speed difference thus calculated. With this, the abnormality diagnosis of the variable compression ratio mechanism can be carried out, without adding any special hardware configuration for estimating a compression ratio.

Specifically, the present disclosure resides in an abnormality diagnostic device for a variable compression ratio mechanism adapted to be applied to an internal combustion engine which includes: the variable compression ratio mechanism that changes a mechanical compression ratio of the internal combustion engine by changing the volume of a combustion chamber; and an engine rotational speed sensor that is configured to obtain an engine rotational speed of said internal combustion engine.

Then, said abnormality diagnostic device comprises a controller comprising at least one processor.

The controller may be configured to:

control a change of the mechanical compression ratio by means of said variable compression ratio mechanism by supplying a command signal to said variable compression ratio mechanism;

calculate a predetermined rotational speed difference which is a rotational speed difference between an engine rotational speed at a predetermined crank angle before or after compression top dead center, and an engine rotational speed in the vicinity of the compression top dead center, for a predetermined cylinder of said internal combustion engine at the time of carrying out fuel cut processing in which fuel injection is stopped during operation of said internal combustion engine;

calculate a reference value of said predetermined rotational speed difference based on an amount of intake air of said internal combustion engine, and said command signal supplied by the controller, and set a reference range of said predetermined rotational speed difference by taking account of a predetermined variation for said reference value; and make a diagnosis that abnormality has occurred in said variable compression ratio mechanism, when said predetermined rotational speed difference calculated by the controller is out of said reference range.

Here, said predetermined crank angle may be defined, for example, as a crank angle in the vicinity of 30 degrees before the compression top dead center, or a crank angle in the vicinity of 30 degrees after the compression top dead center. As mentioned above, the predetermined crank angle before or after the compression top dead center is a crank angle which is relatively near the compression top dead center and at which the rate of change of the cylinder pressure is relatively large. In addition, the influence of the cylinder pressure in the internal combustion engine with respect to the torque to the rotation of the crankshaft at the time of carrying out fuel cut processing practically tends to appear remarkably in the vicinity of ±30 degrees from the compression top dead center, due to the geometrical relation of a piston, a connecting rod and the crankshaft of the internal combustion engine. Then, by calculating said predetermined rotational speed difference with the predetermined crank angle defined as mentioned above, the influence of the mechanical compression ratio with respect to the rotational speed difference can clearly appear, and hence, it becomes easy to determine from the predetermined rotational speed difference whether abnormality has occurred in the mechanical compression ratio. However, in the present disclosure, there is no intention to limit said predetermined crank angle to the above-mentioned crank angle in the vicinity of 30 degrees, and said predetermined crank angle need only be a crank angle at which the influence of the mechanical compression ratio with respect to said predetermined rotational speed difference can appear.

Moreover, the variable compression ratio mechanism according to the present disclosure is to change the mechanical compression ratio of the internal combustion engine by changing the volume of the combustion chamber, and when the variable compression ratio mechanism is put into a predetermined control state by said command signal, the volume of the combustion chamber will be adjusted to a predetermined volume. In addition, the variable compression ratio mechanism according to the present disclosure may be like the variable-length connecting rod of which the effective length changes and which is disclosed in the patent literature 2 or 3, or may be like a multi-link type piston-crank mechanism disclosed in the patent literature 1, if the mechanical compression ratio of the internal combustion engine can be put into a predetermined compression ratio by adjusting the volume of the combustion chamber to the predetermined compression ratio and the mechanical compression ratio can be changed. Here, note that in the present disclosure, when the variable compression ratio mechanism is normal, the mechanical compression ratio of the internal combustion engine is adjusted to a mechanical compression ratio corresponding to said command signal supplied by said controller. On the other hand, when abnormality has occurred in the variable compression ratio mechanism, an actual mechanical compression ratio becomes separated or deviated from the mechanical compression ratio corresponding to said command signal supplied by said controller. In such a case, it becomes difficult to make suitable adjustment of the compression ratio according to the operating state of the internal combustion engine.

Accordingly, the controller of said abnormality diagnostic device calculates the reference value of said predetermined rotational speed difference based on the amount of intake air, which is a parameter having an influence on the cylinder pressure of the internal combustion engine at the time of carrying out fuel cut processing (i.e., a parameter which affects said predetermined rotational speed difference), and said command signal supplied by the controller, and sets the reference range of said predetermined rotational speed difference based on said reference value by taking a predetermined variation into consideration. Then, when said predetermined rotational speed difference calculated based on the actual engine rotational speed obtained by the engine rotational speed sensor is out of said reference range, the controller of said abnormality diagnostic device diagnoses that abnormality has occurred in the variable compression ratio mechanism. Here, note that the above-mentioned predetermined variation results, for example, from dimensional tolerances of the component parts of the internal combustion engine, etc. That is, even when the variable compression ratio mechanism is normal, the mechanical compression ratio becomes a value including a certain range due to production variation of a piston or the like, such a range is taken into consideration in the above-mentioned predetermined variation.

The abnormality diagnostic device for a variable compression ratio mechanism according to the present disclosure makes it possible to carry out abnormality diagnosis of the variable compression ratio mechanism, by carrying out the abnormality diagnosis of the variable compression ratio mechanism in the manner as stated above, without adding any particular hardware structure for estimating the compression ratio.

Further, said internal combustion engine may have a plurality of cylinders, and said variable compression ratio mechanism may be provided for each of said plurality of cylinders.

In this case, said controller may be further configured to:
control the change of mechanical compression ratios by means of said variable compression ratio mechanisms in such a manner that the mechanical compression ratios become unified for all of said plurality of cylinders;
calculate said predetermined rotational speed difference for each of said plurality of cylinders at the time of carrying out said fuel cut processing; and
diagnose, with respect to a cylinder among said plurality of cylinders in which said predetermined rotational speed difference calculated by the controller is out of said reference range, that abnormality has occurred in a variable compression ratio mechanism mounted on said cylinder.

In the internal combustion engine provided with such variable compression ratio mechanisms, with respect to each of said plurality of cylinders possessed by the internal combustion engine, the mechanical compression ratio of said each cylinder can be changed by said variable compression ratio mechanism for that cylinder. Here, note that the variable compression ratio mechanism at this time is, for example, a variable-length connecting rod of which the effective length changes. Here, in the above-mentioned internal combustion engine, the mechanical compression ratio can be changed for each of the plurality of cylinders in terms of the structure, but it is controlled by said controller so as to become a mechanical compression ratio which is unified according to the operating state for all the cylinders of the internal combustion engine. With this, the variation of torque among the cylinders is suppressed.

On the other hand, with said internal combustion engine, in cases where abnormality occurs in the variable compression ratio mechanism in any cylinder, and where this cylinder is put into a state where a change can not be made to a mechanical compression ratio corresponding to said command signal, there can occur a state where the mechanical compression ratio of this cylinder is different from the mechanical compression ratio of the other cylinders. As a result, the variation of torque among the cylinders becomes remarkable, and such a situation is not desirable.

Accordingly, the controller of said abnormality diagnostic device calculates said predetermined rotational speed difference for each of the plurality of cylinders at the time of carrying out fuel cut processing. With said internal combustion engine including the plurality of cylinders, in cases where it is tried to determine whether abnormality has occurred in the mechanical compression ratio of a specific cylinder, not only the cylinder pressure in this specific cylinder but also the cylinder pressures in the other cylinders can affect the rotational speed difference, and hence, there may be a case where depending on the time when the rotational speed difference is calculated, it is not satisfactory to determine whether abnormality has occurred in the mechanical compression ratios. Here, said predetermined crank angle is a crank angle which is relatively near the compression top dead center of the specific cylinder and at which the rate of change of the cylinder pressure therein is relatively large, i.e., a crank angle at which the influence of the mechanical compression ratio of the specific cylinder with respect to said predetermined rotational speed difference can appear clearly. Accordingly, the influence of the cylinder pressure in the specific cylinder will mainly appear on said predetermined rotational speed difference, so it can be said that it is satisfactory to determine based on such a rotational speed difference whether abnormality has occurred in the mechanical compression ratio of each cylinder.

Then, the controller of said abnormality diagnostic device diagnoses, with respect to a cylinder among said plurality of cylinders in which said predetermined rotational speed difference is out of said reference range, that abnormality has occurred in a variable compression ratio mechanism mounted on said cylinder. This can specify the cylinder which has fallen into a state where the variable compression ratio mechanism corresponding to this cylinder can not change the mechanical compression ratio thereof to a value corresponding to said command signal. Then, when such a cylinder can be specified, the variation of torque among the cylinders can be suppressed as much as possible, for example, by controlling some of the variable compression ratio mechanisms mounted on the other cylinders by another method or technique.

In addition, said variable compression ratio mechanism mounted on each of said plurality of cylinders may change the mechanical compression ratio of the corresponding cylinder to either one of a predetermined low compression ratio and a predetermined high compression ratio. In this case, when said command signal is supplied to said variable compression ratio mechanisms from said controller so that the mechanical compression ratios of said plurality of cylinders are adjusted to said predetermined high compression ratio by means of said variable compression ratio mechanisms, said controller can diagnose, with respect to a cylinder in which said predetermined rotational speed difference calculated by the controller is smaller than a lower limit value of said reference range among said plurality of cylinders, that said variable compression ratio mechanism mounted on said cylinder is fixed to said predetermined low compression ratio. Because said predetermined rotational speed difference becomes larger when the mechanical compression ratio is high than when it is low, the mechanical compression ratio of a cylinder in which said predetermined rotational speed difference is smaller than the lower limit value of said reference range, in spite of the fact that said command signal is supplied so as to adjust the mechanical compression ratio to the predetermined high compression ratio, will be lower than said predetermined high compression ratio, i.e., the variable compression ratio mechanism mounted on that cylinder will be fixed to the predetermined low compression ratio.

Moreover, when said command signal is supplied to said variable compression ratio mechanisms from said controller so that the mechanical compression ratios of said plurality of cylinders are adjusted to said predetermined low compression ratio by means of said variable compression ratio mechanisms, said controller can diagnose, with respect to a cylinder in which said predetermined rotational speed difference calculated by the controller is larger than an upper limit value of said reference range among said plurality of cylinders, that said variable compression ratio mechanism mounted on said cylinder is fixed to said predetermined high compression ratio. The mechanical compression ratio of a cylinder in which said predetermined rotational speed difference is larger than the upper limit value of said reference range, in spite of the fact that said command signal is supplied so as to adjust the mechanical compression ratio to the predetermined low compression ratio, will be higher than said predetermined low compression ratio, i.e., the variable compression ratio mechanism mounted on that cylinder will be fixed to the predetermined high compression ratio.

With such an abnormality diagnostic device for a variable compression ratio mechanism, it is possible not only to specify a cylinder which has fallen into a state where the variable compression ratio mechanism thereof can not change the mechanical compression ratio thereof, but also to diagnose the mechanical compression ratio of that cylinder. Here, in said variable compression ratio mechanism which changes the mechanical compression ratio of a cylinder to either one of the predetermined low compression ratio and the predetermined high compression ratio according to said command signal supplied thereto by said controller, when said variable compression ratio mechanism is fixed to the predetermined low compression ratio or the predetermined high compression ratio, said variable compression ratio mechanism falls into a state where it can not change the mechanical compression ratio to a value corresponding to said command signal. Then, in cases where it is diagnosed that the variable compression ratio mechanism of the specific cylinder is fixed to said predetermined low compression ratio, for example, by controlling a variable compression ratio mechanism mounted on another cylinder to said predetermined low compression ratio by means of another method or technique, or in cases where it is diagnosed that the variable compression ratio mechanism of the specific cylinder is fixed to said predetermined high compression ratio, for example, by controlling the variable compression ratio mechanism mounted on another cylinder to said predetermined high compression ratio by another method or technique, the variation of torque among the cylinders can be suppressed as much as possible.

In addition, in order to solve the aforementioned problems, the present disclosure resides, in another aspect, in an abnormality diagnostic device for a variable compression ratio mechanism adapted to be applied to an internal combustion engine which includes: a variable compression ratio mechanism that changes a mechanical compression ratio of an internal combustion engine by changing a volume of a combustion chamber; and an engine rotational speed sensor that is configured to obtain an engine rotational speed of said internal combustion engine; wherein said abnormality diagnostic device comprises a controller comprising at least one processor.

The controller may be configured to:

control a change of the mechanical compression ratio by means of said variable compression ratio mechanism by supplying a command signal to said variable compression ratio mechanism;

calculate a predetermined rotational speed difference which is a rotational speed difference between an engine rotational speed at a predetermined crank angle before or after compression top dead center, and an engine rotational speed in the vicinity of the compression top dead center, for a predetermined cylinder of said internal combustion engine at the time of carrying out fuel cut processing in which fuel injection is stopped during operation of said internal combustion engine;

obtain a command compression ratio which is a mechanical compression ratio based on said command signal supplied by the controller, and set a reference range of said command compression ratio by taking account of a predetermined compression ratio variation for said command compression ratio;

estimate an actual mechanical compression ratio, which is an actual mechanical compression ratio of said internal combustion engine, based on an amount of intake air of said internal combustion engine, and said predetermined rotational speed difference calculated by the controller, and estimate said actual mechanical compression ratio which is higher when said predetermined rotational speed difference is large than when it is small, in cases where the amount of intake air is the same; and make a diagnosis that abnormality has occurred in said variable compression ratio mechanism, when said actual mechanical compression ratio estimated by the controller is out of the reference range of said command compression ratio.

Said predetermined rotational speed difference is mainly affected by the influence of the amount of intake air and the actual mechanical compression ratio which is the actual mechanical compression ratio of the internal combustion engine. In other words, it can be said that these parameters have correlation with one another. Accordingly, the controller with which said abnormality diagnostic device is provided can estimate said actual mechanical compression ratio based on the amount of intake air and said predetermined rotational speed difference. In addition, as mentioned above, said predetermined rotational speed difference occurs according to the cylinder pressures in the vicinity of the compression top dead center and at the predetermined crank angle, and as the pressure difference between the cylinder pressure in the vicinity of the compression top dead center and the cylinder pressure at the predetermined crank angle becomes larger, the predetermined rotational speed difference also becomes larger. Then, the higher the mechanical compression ratio, the larger said pressure difference becomes, and so, in cases where the amount of intake air is the same, said predetermined rotational speed difference becomes larger when the mechanical compression ratio is high than when it is low. Accordingly, in the case where the amount of intake air is the same, said controller estimates said actual mechanical compression ratio which is higher when said predetermined rotational speed difference is large than when it is small. Then, with such an abnormality diagnostic device, it becomes possible to estimate the mechanical compression ratio of the internal combustion engine, without adding any special configuration or construction.

Then, said abnormality diagnostic device makes it possible to diagnose, based on said actual mechanical compression ratio thus estimated, whether abnormality has occurred in the variable compression ratio mechanism. Here, note that at this time, variation in the mechanical compression ratio resulting from the dimensional tolerances of the component parts of the internal combustion engine, etc., is taken into consideration.

According to the present disclosure, an abnormality diagnosis of a variable compression ratio mechanism can be carried out, without adding any special hardware configuration for estimating a compression ratio.

BRIEF DESCRIPTION OF DRAWINGS

FIG. 1 is a diagram showing the general configuration of an internal combustion engine and its intake and exhaust systems according to an embodiment of the present disclosure.

FIG. 2 is a diagram showing a cross-sectional schematic diagram of an internal combustion engine according to the embodiment of the present disclosure.

FIG. 3 is a diagram showing the configuration of a variable-length connecting rod according to the embodiment of the present disclosure.

FIG. 4 is a diagram showing a first state switching system according to the embodiment of the present disclosure.

FIG. 5 is a diagram showing a second state switching system according to the embodiment of the present disclosure.

FIG. 6 is a graph showing the changes over time of the engine rotational speed when #1 cylinder and #4 cylinder are failed cylinders, in the embodiment of the present disclosure.

FIG. 7 is a graph showing the relation of a mechanical compression ratio and a cylinder pressure at the time of carrying out fuel cut processing and in the case of an amount of intake air being the same.

FIG. 8 is a graph showing the changes over time of an engine rotational speed and a torque around a crankshaft when the #1 cylinder and the #4 cylinder are failed cylinders, in the embodiment of the present disclosure.

FIG. 9 is a flow chart showing a flow of abnormality diagnosis of a variable compression ratio mechanism according to the embodiment of the present disclosure.

FIG. 10 is a graph showing a comparison between a case where the amount of intake air is large, and a case where it is small, in the change over time of the engine rotational speed according to the embodiment of the present disclosure.

FIG. 11 is a flow chart showing a flow of abnormality diagnosis of a variable compression ratio mechanism according to a second modification of the first embodiment of the present disclosure.

FIG. 12 is a graph explaining influences which mechanical compression ratios have on the correlation between an amount of intake air and a predetermined rotational speed difference.

FIG. 13 is a flow chart showing a flow of abnormality diagnosis of a variable compression ratio mechanism according to a second embodiment of the present disclosure.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless stated otherwise.

First Embodiment

Hereinafter, a first embodiment of the present disclosure will be explained by using the attached drawings. FIG. 1 is a diagram showing the general configuration of an internal combustion engine and its intake and exhaust systems according to the first embodiment of the present disclosure. The internal combustion engine 1 shown in FIG. 1 is a spark ignition type internal combustion engine (gasoline engine) provided with a cylinder group including four cylinders 2. On the internal combustion engine 1, there are mounted fuel injection valves 3 for directly injecting fuel into the cylinders 2 and spark plugs 4 for igniting mixtures therein, respectively. Here, in the internal combustion engine 1, combustion in the cylinders 2 is carried out in one operating cycle (720 degrees of crank angle) in order of #1 cylinder, #3 cylinder, #4 cylinder, and #2 cylinder.

An intake manifold 401 and an exhaust manifold 501 are connected to the internal combustion engine 1. An intake passage 400 is connected to the intake manifold 401. In the intake passage 400, there are arranged an air flow meter 403 and a throttle valve 402. The air flow meter 403 outputs an electrical signal corresponding to an amount (mass) of intake air (air) flowing in the intake passage 400. The throttle valve 402 is arranged in the intake passage 400 at the downstream side of the air flow meter 403. The throttle valve 402 serves to adjust the amount of intake air in the internal combustion engine 1 by changing the channel cross section of the intake passage 400. Moreover, an intake manifold pressure sensor 404 is mounted on the intake manifold 401 connected to the intake passage 400 at the downstream side of the throttle valve 402. The intake manifold pressure sensor 404 outputs an electrical signal corresponding to a pressure of intake air in the intake manifold 401 (hereinafter, sometimes referred to as an "intake manifold pressure"). In addition, an exhaust passage 500 is connected to the exhaust manifold 501. The exhaust passage 500 is opened into the atmosphere by way of an unillustrated catalyst and an unillustrated silencer.

Further, a cross-sectional schematic diagram of the internal combustion engine 1 is shown in FIG. 2. FIG. 2 is the cross-sectional schematic diagram of the internal combustion engine 1 along line S-S in FIG. 1. As shown in FIG. 2, the internal combustion engine 1 is provided with a cylinder block 7 and a cylinder head 8. A crankshaft 200 is accommodated in the cylinder block 7 so as to be free to rotate. A plurality of (e.g., four) columnar cylinders 2 are formed in the cylinder block 7. A piston 5 is received inside each cylinder 2 for sliding movement relative thereto. The piston 5 and the crankshaft 200 are connected with each other by a variable-length connecting rod 6 to be described later. An intake port 11 and an exhaust port 14 for each cylinder 2 are formed in the cylinder head 8. The cylinder head 8 is provided with an intake valve 9 for opening and closing an opening end of the intake port 11 in a combustion chamber 300 of each cylinder 2, and an intake camshaft 10 for driving to open and close the intake valve 9. The cylinder head 8 is provided with an exhaust valve 12 for opening and closing an opening end of the exhaust port 14 in the combustion chamber 300 of each cylinder 2, and an exhaust camshaft 13 for driving to open and close the exhaust valve 12. Moreover, the cylinder head 8 is provided with a fuel injection valve 3 for directly injecting fuel into the combustion chamber 300 of each cylinder 2, and a spark plug 4 for igniting a mixture in the combustion chamber 300 of each cylinder 2.

Here, the variable-length connecting rod 6 is connected to a piston 5 by a piston pin 21 at its smaller end and connected to a crankpin 22 of the crankshaft 200 at its larger end. The variable-length connecting rod 6 can change its effective length, that is, the distance from the axis of the piston pin 21 to the axis of the crankpin 22.

When the effective length of the variable-length connecting rod 6 is long, the length from the axis of the crankpin 22 to the axis of the piston pin 21 is long, and the volume of the combustion chamber 300 at the time when the piston 5 is located at the top dead center is small accordingly, as illustrated by solid lines in FIG. 2. On the other hand, when the effective length of the variable-length connecting rod 6 is short, the length from the axis of the crankpin 22 to the axis of the piston pin 21 is short, and the volume of the combustion chamber 300 at the time when the piston 5 is at the top dead center is large accordingly, as illustrated by broken lines in FIG. 2. While the effective length of the variable-length connecting rod 6 varies as described above, the stroke of the piston 5 does not vary. Hence, the mechanical compression ratio defined as the ratio of the inner volume of the cylinder (that is, the volume of the combustion chamber) at the time when the piston 5 is at the top dead center and the inner volume of the cylinder at the time when the piston 5 is at the bottom dead center varies.

(Structure of Variable-Length Connecting Rod 6)

Now, the structure of the variable-length connecting rod 6 in this embodiment will be described with reference to FIG. 3. The variable-length connecting rod 6 includes a connecting rod main body 31, an eccentric member 32 rotatably attached to the connecting rod main body 31, a first piston mechanism 33 provided in the connecting rod main body 31, a second piston mechanism 34 provided in the connecting rod main body 31, and a switching system 35 that switches the flow of hydraulic oil to the piston mechanisms 33, 34.

The connecting rod main body 31 has a crank receiving bore 41 at one end, which receives the crankpin 22 of the crankshaft 200, and a sleeve receiving bore 42 at the other end, which receives a sleeve of the eccentric member 32, which will be described later. Since the crank receiving bore 41 is larger than the sleeve receiving bore 42, the end of the connecting rod main body 31 that has the crank receiving bore 41 will be called the larger end 31a, and the end of the connecting rod main body 31 that has the sleeve receiving bore 42 will be called the smaller end 31b.

In this specification, a virtual straight line passing through the center axis of the crank receiving bore 41 (namely, the center axis of the crankpin 22 received in the crank receiving bore 41) and the center axis of the sleeve receiving bore 42 (namely, the center axis of the sleeve received in the sleeve receiving bore 42) will be referred to as the axis X of the variable-length connecting rod 6. The dimension of the variable-length connecting rod 6 along the direction perpendicular to the axis X of the variable-length connecting rod 6 and to the center axis of the crank receiving bore 41 will be called the width of the variable-length connecting rod 6. The dimension of the variable-length connecting rod 6 along the direction parallel to the center axis of the crank receiving bore 41 will be called the thickness of the variable-length connecting rod 6.

The eccentric member 32 has a cylindrical sleeve 32a received in the sleeve receiving bore 42 of the connecting rod main body 31, a first arm 32b extending from the sleeve 32a in a first direction with respect to the width direction of the connecting rod main body 31, and a second arm 32c extending from the sleeve 32a in a second direction (nearly opposite to the aforementioned first direction) with respect to the width direction of the connecting rod main body 31. The sleeve 32a is rotatable in the sleeve receiving bore 42, and the eccentric member 32 is attached to the smaller end portion 31b of the connecting rod main body 31 in such a way as to be rotatable relative to the connecting rod main body 31 in the circumferential direction of the smaller end portion 31b.

The sleeve 32a of the eccentric member 32 has a piston pin receiving bore 32d that receives the piston pin 21. The piston pin receiving bore 32d has a cylindrical shape. The cylindrical piston pin receiving bore 32d is offset from the center axis of the sleeve 32a.

Since the center axis of the piston pin receiving bore 32d is offset from the center axis of the sleeve 32a, rotation of the eccentric member 32 causes the position of the piston pin receiving bore 32d in the sleeve receiving bore 42 to change. When the piston pin receiving bore 32d is located at the side of the sleeve receiving bore 42 near the larger end 31a, the effective length of the variable-length connecting rod 6 is short. When the piston pin receiving bore 32d is located at the side of the sleeve receiving bore 42 away from the larger end 31a, the effective length of the variable-length connecting rod 6 is long. Thus, the effective length of the variable-length connecting rod 6 can be changed by rotating the eccentric member 32.

The first piston mechanism 33 includes a first cylinder 33a formed in the connecting rod main body 31 and a first piston 33b capable of sliding in the first cylinder 33a. The most part or entirety of the first cylinder 33a is located on the first arm 32b side of the axis X of the variable-length connecting rod 6. The first cylinder 33a is oriented obliquely to the axis X at a certain angle so that the first cylinder 33a sticks out in the width direction of the connecting rod main body 31 as it extends toward the smaller end 31*b* of the connecting rod main body 31. The first cylinder 33*a* is in communication with the switching system 35 through an oil channel 51 (which will be hereinafter referred to as the "first PCO-channel 51").

The first piston 33*b* is connected to the first arm 32*b* of the eccentric member 32 by a first link member 45. The first piston 33*b* is rotatably connected to the first link member 45 by a pin. The first arm 32*b* is rotatably connected to the first link member 45 by a pin at its end opposite to the end at which it is connected to the sleeve 32*a*.

The second piston mechanism 34 includes a second cylinder 34*a* formed in the connecting rod main body 31 and a second piston 34*b* capable of sliding in the second cylinder 34*a*. The most part or entirety of the second cylinder 34*a* is located on the second arm 32*c* side of the axis X of the variable-length connecting rod 6. The second cylinder 34*a* is oriented obliquely to the axis X at a certain angle so that the second cylinder 34*a* sticks out in the width direction of the connecting rod main body 31 as it extends toward the smaller end 31*b* of the connecting rod main body 31. The second cylinder 34*a* is in communication with the switching system 35 through an oil channel 52 (which will be hereinafter referred to as the "second PCO-channel 52").

The second piston 34*b* is connected to the second arm 32*c* of the eccentric member 32 by a second link member 46. The second piston 34*b* is rotatably connected to the second link member 46 by a pin. The second arm 32*c* is rotatably connected to the second link member 46 by a pin at its end opposite to the end at which it is connected to the sleeve 32*a*.

As will be described later, the switching system 35 is a system that enables switching between a first state in which the flow of hydraulic oil from the first cylinder 33*a* to the second cylinder 34*a* is shut off and the flow of hydraulic oil from the second cylinder 34*a* to the first cylinder 33*a* is allowed and a second state in which the flow of hydraulic oil from the first cylinder 33*a* to the second cylinder 34*a* is allowed and the flow of hydraulic oil from the second cylinder 34*a* to the first cylinder 33*a* is shut off.

When the switching system 35 is in the aforementioned first state, the hydraulic oil is supplied into the first cylinder 33*a*, and the hydraulic oil is discharged from the second cylinder 34*a*. Consequently, the first piston 33*b* moves up, and the first arm 32*b* of the eccentric member 32 connected to the first piston 33*b* also moves up accordingly. On the other hand, the second piston 34*b* moves down, and the second arm 32*c* connected to the second piston 34*b* also moves down accordingly. In consequence, the eccentric member 32 turns in the clockwise direction in FIG. 2, so that the piston pin receiving bore 32*d* shifts away from the crankpin 22. In other words, the effective length of the variable-length connecting rod 6 becomes longer. As the second piston 34*b* abuts the bottom of the second cylinder 34*a*, the turn of the eccentric member 32 is restricted, and the rotational position of the eccentric member 32 is maintained at that position.

When the switching system 35 is in the first state, the first piston 33*b* and the second piston 34*b* move to the aforementioned positions, basically without external supply of hydraulic oil. This is because when an upward inertial force acts on the piston 5 during the reciprocation of the piston 5 in the cylinder 2 of the internal combustion engine 1, the second piston 34*b* is pushed in, whereby the hydraulic oil in the second cylinder 34*a* is transferred to the first cylinder 33*a*. When a downward inertial force acts on the piston 5 during the reciprocation of the piston 5 in the cylinder 2 of the internal combustion engine 1 or when a downward force acts on the piston 5 by combustion of air-fuel mixture in the combustion chamber 300, a force acts on the first piston 33*b* in the pushing-in direction. However, since the flow of the hydraulic oil from the first cylinder 33*a* to the second cylinder 34*a* is shut off by the switching system 35, the hydraulic oil in the first cylinder 33*a* does not flow out of it. Hence, the first piston 33*b* is not pushed in.

When the switching system 35 is in the second state, the hydraulic oil is supplied into the second cylinder 34*a* and discharged from the first cylinder 33*a*. Consequently, the second piston 34*b* moves up, and the second arm 32*c* of the eccentric member 32 connected to the second piston 34*b* also moves up accordingly. On the other hand, the first piston 33*b* moves down, and the first arm 32*b* connected to the first piston 33*b* also moves down. In consequence, the eccentric member 32 turns in the anticlockwise direction in FIG. 3, so that the piston pin receiving bore 32*d* shifts toward the crankpin 22. In other words, the effective length of the variable-length connecting rod 6 becomes shorter. As the first piston 33*b* abuts the bottom of the first cylinder 33*a*, the turn of the eccentric member 32 is restricted, and the rotational position of the eccentric member 32 is maintained at that position. Thus the compression ratio of the internal combustion engine 1 is lower when the switching system 35 is in the aforementioned second state than when it is in the aforementioned first state. Hereinafter, the mechanical compression ratio at the time when the switching system 35 is in the above-mentioned first state is referred to as a first compression ratio, and the mechanical compression ratio at the time when the switching system 35 is in the above-mentioned second state is referred to as a second compression ratio, wherein the first compression ratio is become larger than the second compression ratio.

When the switching system 35 is in the second state, the first piston 33*b* and the second piston 34*b* move to the aforementioned positions, basically without external supply of hydraulic oil. This is because when a downward inertial force acts on the piston 5 during the reciprocation of the piston 5 in the cylinder 2 of the internal combustion engine 1 or when a downward force acts on the piston 5 by combustion of air-fuel mixture in the combustion chamber 300, the first piston 33*b* is pushed in, whereby the hydraulic oil in the first cylinder 33*a* is transferred to the second cylinder 34*a*. When an upward inertial force acts on the piston 5 during the reciprocation of the piston 5 in the cylinder 2 of the internal combustion engine 1, a force acts on the second piston 34*b* in the pushing-in direction. However, since the flow of the hydraulic oil from the second cylinder 34*a* to the first cylinder 33*a* is shut off by the switching system 35, the hydraulic oil in the second cylinder 34*a* does not flow out of it. Hence, the second piston 34*b* is not pushed in.

(Structure of the Switching System)

An embodiment of the switching system will be described with reference to FIGS. 4 and 5. FIG. 4 shows the switching system 35 in the first state, and FIG. 5 shows the switching system 35 in the second state. The switching system 35 includes two switching pins 61, 62 and a check valve 63. The two switching pins 61 and 62 are slidably housed in cylindrical pin housing spaces 64 and 65 respectively. The arrows in FIGS. 4 and 5 indicate the flows of the hydraulic oil in the first state and the second state.

A first switching pin 61 among the aforementioned two switching pins 61, 62 has two circumferential grooves 61*a*, 61*b* extending along its circumference. The circumferential grooves 61*a*, 61*b* are in communication with each other through a communication channel 61c formed in the first switching pin 61. In the first pin housing space 64, in which the first switching pin 61 is housed, a first bias spring 67 that biases the first switching pin 61 is also provided.

The second switching pin 62 among the aforementioned two switching pins 61, 62 also has two circumferential grooves 62a, 62b extending along its circumference. The circumferential grooves 62a, 62b are in communication with each other through a communication channel 62c formed in the second switching pin 62. In the second pin housing space 65, in which the second switching pin 62 is housed, a second bias spring 68 that biases the second switching pin 62 is also provided.

The check valve 63 is housed in a check valve housing space 66 having a cylindrical shape. The check valve 63 is adapted to allow the fluid flow from the primary or upstream side (i.e. the upper side in FIG. 4) to the secondary or downstream side (i.e. the lower side in FIG. 4) and to interrupt the fluid flow from the secondary side to the primary side.

The first pin housing space 64 in which the first pin 61 is housed is in communication with the first cylinder 33a through the first PCO-channel 51. The first pin housing space 64 is in communication with the check valve housing space 66 through two oil channels 53, 54. One of the two oil channels, or the oil channel 53 (which will be hereinafter referred to as the "first SCO-channel 53"), provides communication between the first pin housing space 64 and the secondary side of the check valve housing space 66. The other of the two oil channels, or the oil channel (which will be hereinafter referred to as the "second SCO-channel 54"), provides communication between the first pin housing space 64 and the primary side of the check valve housing space 66.

The second pin housing space 65 in which the second pin 62 is housed is in communication with the second cylinder 34a through the second PCO-channel 52. The second pin housing space 65 is in communication with the check valve housing space 66 through two oil channels 55, 56. One of the two oil channels, or the oil channel 55 (which will be hereinafter referred to as the "third SCO-channel 55"), provides communication between the second pin housing space 65 and the secondary side of the check valve housing space 66. The other of the two oil channels, or the oil channel 56 (which will be hereinafter referred to as the "forth SCO-channel 56"), provides communication between the second pin housing space 65 and the primary side of the check valve housing space 66.

The first pin housing space 64 is in communication with a first control oil channel 57 formed in the connecting rod main body 31. Specifically, the first control oil channel 57 is in communication with the first pin housing space 64 at its end opposite to the end at which the first bias spring 67 is provided. The second pin housing space 65 is in communication with a second control oil channel 58 formed in the connecting rod main body 31. Specifically, the second control oil channel 58 is in communication with the second pin housing space 65 at its end opposite to the end at which the second bias spring 68 is provided. The first control oil channel 57 and the second control oil channel 58 are in communication with the crank receiving bore 41 and with an external oil switching valve (OSV) 75 through an oil channel (not shown) formed in the crank pin 22. The OSV 75 is a valve system that enables switching between communication and interruption between the two control oil channels 57, 58 and an oil pump that is not shown in the drawings.

The primary side of the check valve housing space 66 is in communication with a hydraulic oil source 76 such as an oil pump through an additional oil channel 59. The additional oil channel 59 is an oil channel though which oil is added to compensate for oil leaking from some portions of the switching system 35 to the outside.

(Operation of the Switching System 35)

In the above-described switching system 35, when the OSV 75 allows the communication between the control oil channels 57, 58 and the oil pump, the biasing springs 67, 68 are compressed by the hydraulic pressure acting on the switching pins 61, 62, so that the switching pins 61, 62 are brought to and kept at positions that allow communication between the first PCO-channel 51 and the first SCO-channel 53 through the communication channel 61c of the first switching pin 61 and communication between the second PCO-channel 52 and the fourth SCO-channel 56 through the communication channel 62c of the second switching pin 62, as shown in FIG. 4. Thus, the first cylinder 33a is connected to the secondary side of the check valve 63, and the second cylinder 34a is connected to the primary side of the check valve 63. In consequence, while the hydraulic oil in the second cylinder 34a can be transferred to the first cylinder 33a through the second PCO-channel 52, the fourth SCO-channel 56, the first SCO-channel 53, and the first PCO-channel 51, the hydraulic oil in the first cylinder 33a cannot be transferred to the second cylinder 34a. Hence, when the OSV 75 keeps the control oil channels 57, 58 and the oil pump in communication with each other, the state (or the first state) in which the flow of the hydraulic oil from the first cylinder 33a to the second cylinder 34a is shut off and the flow of the hydraulic oil from the second cylinder 34a to the first cylinder 33a is allowed is established.

When the OSV 75 interrupts the communication between the control oil channels 57, 58 and the oil pump, only the biasing force of the bias springs 67, 68 acts on the switching pins 61, 62, so that the switching pins 61, 62 are brought to and kept at positions that allow communication between the first PCO-channel 51 and the second SCO-channel 54 through the communication channel 61c of the first switching pin 61 and communication between the second PCO-channel 52 and the third SCO-channel 55 through the communication channel 62c of the second switching pin 62, as shown in FIG. 5. Thus, the first cylinder 33a is connected to the primary side of the check valve 63, and the second cylinder 34a is connected to the secondary side of the check valve 63. In consequence, while the hydraulic oil in the first cylinder 33a can be transferred to the second cylinder 34a through the first PCO-channel 51, the second SCO-channel 54, the third SCO-channel 55, and the second PCO-channel 52, the hydraulic oil in the second cylinder 34a cannot be transferred to the first cylinder 33a. Hence, when the OSV 75 interrupts the communication between the control oil channels 57, 58 and the oil pump, the state (or the second state) in which the flow of the hydraulic oil from the first cylinder 33a to the second cylinder 34a is allowed and the flow of the hydraulic oil from the second cylinder 34a to the first cylinder 33a is shut off is established.

As described above, when the supply and interruption of the hydraulic oil with respect to the first pin housing space 64 and the second pin housing space 65 are switched over by the OSV 75, the switching system 35 can be switched over between the first state and the second state, and the mechanical compression ratio of the internal combustion engine 1 can be accordingly switched to either one of the first compression ratio and the second compression ratio. Here, note that in this embodiment, the first compression ratio corresponds to a predetermined high compression ratio in the present disclosure, and the second compression ratio corresponds to a predetermined low compression ratio in the present disclosure.

Here, returning to FIG. 1, an electronic control unit (ECU) 100 is provided in combination with the internal combustion engine 1 as constructed in the above-mentioned manner. This ECU 100 is a unit that controls an operating state, etc., of the internal combustion engine 1. A variety of kinds of sensors such as an accelerator position sensor 201, a crank position sensor 202, etc., in addition to the air flow meter 403 and the intake manifold pressure sensor 404 mentioned above, are electrically connected to the ECU 100. The accelerator position sensor 201 is a sensor which outputs an electrical signal correlated with an amount of operation (accelerator opening) of an unillustrated accelerator pedal. The crank position sensor 202 is a sensor which outputs an electrical signal correlated with the rotational position of an engine output shaft (crankshaft) of the internal combustion engine 1. The output signals of these sensors are inputted to the ECU 100. The ECU 100 derives the engine load of the internal combustion engine 1 based on the output signal of the accelerator position sensor 201. In addition, the ECU 100 derives the engine rotational speed of the internal combustion engine 1 based on the output value of the crank position sensor 202. Here, note that in this embodiment, the crank position sensor 202 corresponds to an engine rotational speed sensor in the present disclosure.

Moreover, a variety of kinds of devices such as the fuel injection valves 3, the spark plugs 4, the throttle valve 402, the OSV 75 and so on are electrically connected to the ECU 100. Thus, these variety of kinds of devices are controlled by the ECU 100. For example, the ECU 100 controls the OSV 75 according to the engine load. Specifically, when the engine load is less than a predetermined threshold value, the ECU 100 controls the OSV 75 in such a manner that the mechanical compression ratio of the internal combustion engine 1 becomes the above-mentioned first compression ratio (i.e., the switching system 35 becomes the first state). On the other hand, when the engine load is equal to or larger than the predetermined threshold value, the ECU 100 controls the OSV 75 in such a manner that the mechanical compression ratio of the internal combustion engine 1 becomes the above-mentioned second compression ratio (i.e., the switching system 35 becomes the second state). Then, with the internal combustion engine 1 according to this embodiment in which the position of top dead center of the piston 5 received in each of the cylinders 2 is changed by a change of the effective length of the variable-length connecting rod 6, the mechanical compression ratio can be changed for each of the cylinders 2, but the mechanical compression ratios of all the cylinders are in principle adjusted to a unified mechanical compression ratio according to the engine operating state. Here, note that in this embodiment, the variable-length connecting rod 6 corresponds to a variable compression ratio mechanism in the present disclosure.

Here, in the variable-length connecting rod 6, it is constructed such that the mechanical compression ratio of each cylinder 2 of the internal combustion engine 1 is controlled by operation of the OSV 75 according to a command signal from the ECU 100, as mentioned above. However, due to the reasons such as the irregular supply of hydraulic oil, the operational failure of the first and second piston mechanisms 33, 34, etc., there may occur a state where the control of the mechanical compression ratio using the variable-length connecting rod 6 by means of the ECU 100 is not carried out in a manner as required by a command signal from the ECU 100, i.e., an abnormal state of the variable-length connecting rod 6. Then, when an abnormal state occurs in the variable-length connecting rod 6 mounted on a specific cylinder, it becomes impossible to change, in this cylinder, the mechanical compression ratio to one corresponding to the command signal from the ECU 100. That is, the mechanical compression ratio of the specific cylinder becomes a state where it is fixed to the first compression ratio or the second compression ratio. Here, note that in this description, the above-mentioned specific cylinder, in which an abnormal state has occurred in the variable-length connecting rod 6, is referred to as a failed cylinder. In addition, the ECU 100 functions as a controller according to the present disclosure by supplying a command signal to the variable-length connecting rod 6 thereby to control the mechanical compression ratio.

Then, when such a situation occurs, it becomes difficult to make suitable adjustment of the mechanical compression ratio according to the operating state of the internal combustion engine 1. In addition, the mechanical compression ratio of the failed cylinder can be made different from the mechanical compression ratios of the other cylinders, so the variation of torque among the cylinders becomes remarkable, and this is not desirable. Accordingly, a technology capable of making an abnormality diagnosis of the variable-length connecting rod 6 is required.

Accordingly, the ECU 100 according to this embodiment calculates a rotational speed difference (hereinafter, sometimes referred to as a predetermined rotational speed difference) between an engine rotational speed at a predetermined crank angle before or after compression top dead center, and an engine rotational speed in the vicinity of the compression top dead center, for a predetermined cylinder 2 at the time of carrying out fuel cut processing in which fuel injection from the fuel injection valves 3 is stopped during the operation of the internal combustion engine 1. Then, the ECU 100 performs an abnormality diagnosis of the variable-length connecting rod 6 based on the predetermined rotational speed difference thus calculated. Here, note that the ECU 100 also functions as the controller according to the present disclosure, by calculating the predetermined the rotational speed difference in this manner.

Here, FIG. 6 shows the changes over time of the engine rotational speed at the time of carrying out fuel cut processing and when the #1 cylinder and the #4 cylinder are failed cylinders among a cylinder group with which the internal combustion engine 1 is provided. In FIG. 6, the ECU 100 supplies the command signal to the variable-length connecting rod 6 so that the mechanical compression ratio of each cylinder 2 of the internal combustion engine 1 becomes the first compression ratio, and the mechanical compression ratios of the #2 cylinder and the #3 cylinder in which abnormality has not occurred for the variable-length connecting rod 6 are the first compression ratio. On the other hand, the mechanical compression ratios of the #1 cylinder and the #4 cylinder, which are failed cylinders, are in a state where they have been fixed to the second compression ratio. In addition, in FIG. 6, the change over time of the actual engine rotational speed is indicated by a solid line, and an average rotational speed, which is obtained by averaging the actual engine rotational speed, is indicated by a broken line. Here, note that in FIG. 6, the amount of intake air is assumed to be unchanged.

As shown in FIG. 6, the fuel cut processing is carried out at this time, so the average rotational speed becomes gradually smaller with the elapse of time. In addition, the actual engine rotational speed varies, and, for example, when attention is focused on a period of time from a time point t1 to a time point t2, which represents a predetermined period of time in the compression and expansion strokes of the #3 cylinder, the actual engine rotational speed is smaller than the average rotational speed in this predetermined period of time including the compression top dead center of this cylinder. Such a tendency will become the same for the other cylinders 2. Here, when a comparison is made between the tendency of the #3 cylinder controlled to the first compression ratio and the tendency of the #4 cylinder, which is a failed cylinder and is fixed to the second compression ratio, a variation of the actual engine rotational speed in the #4 cylinder is smaller than that in the #3 cylinder (a variation of the actual engine rotational speed in a period of time from a time point t3 to a time point t4 is smaller than that in the period of time from the time point t1 to the time point t2). This suggests that the difference in the mechanical compression ratios of the individual cylinders 2 affects the above-mentioned predetermined rotational speed difference. Here, note that the above-mentioned predetermined rotational speed difference is a rotational speed difference between the engine rotational speeds in the vicinity of the compression top dead center and at the predetermined crank angle, as mentioned above, and so it has a relation with the above-mentioned variation of the engine rotational speed, but is not the same as that.

Then, when carrying out the fuel cut processing, the influence of the combustion state is eliminated, so a strong correlation can be found between the mechanical compression ratio of each cylinder 2 of the internal combustion engine 1 and the cylinder pressure in the compression and expansion strokes of that cylinder. FIG. 7 shows the relation of the mechanical compression ratio and the cylinder pressure at the time of carrying out fuel cut processing and in the case of the amount of intake air being the same. In FIG. 7, a solid line indicates a case where the mechanical compression ratio is the first compression ratio, and a broken line indicates a case where the mechanical compression ratio is the second compression ratio. As shown in FIG. 7, when the mechanical compression ratio is the first compression ratio which is the predetermined high compression ratio, the cylinder pressure in the compression and expansion strokes becomes higher than when the mechanical compression ratio is the second compression ratio which is the predetermined low compression ratio. This is also clear from cycle calculation of the internal combustion engine 1, and, for example, a compression end pressure P2 is calculated by the following expression 1.

$$P2 = P1 \times \varepsilon^n \qquad \text{Expression 1}$$

where P2 is the compression end pressure; P1 is a pressure at the time of the start of compression; ε is the mechanical compression ratio; and n is a polytropic exponent.

Here, P1 in the above expression 1 becomes higher as the amount of intake air becomes larger. Accordingly, the cylinder pressure in the compression and expansion strokes at the time of carrying out the fuel cut processing has also correlation with the amount of intake air, so that the cylinder pressure will become higher when the amount of intake air is large, than when it is small.

Then, there is a tendency that according to the cylinder pressure in each cylinder 2 of the internal combustion engine 1 which has correlation with the mechanical compression ratio thereof, as mentioned above, torque for rotation of the crankshaft 200 changes, and further, the engine rotational speed also changes. In other words, due to the difference between the mechanical compression ratios of the individual cylinders 2, the torque for rotation of the crankshaft 200 will change, and as a result, the above-mentioned predetermined rotational speed difference may occur.

Accordingly, in order to explain the above-mentioned predetermined rotational speed difference in detail, the change over time of the torque for rotation of the crankshaft 200 is shown in FIG. 8 in combination with the changes over time of the engine rotational speed shown in the above-mentioned FIG. 6. Here, in FIG. 8, the change over time of one arbitrary cycle is shown among the changes over time shown in the above-mentioned FIG. 6. Here, note that in FIG. 8, torque around the crankshaft indicates the torque for rotation of the crankshaft 200. In addition, similar to the above-mentioned FIG. 6, the amount of intake air is assumed to be unchanged.

As shown in the upper portion of FIG. 8, a predetermined torque difference ΔTR1 between torques around the crankshaft before and after the compression top dead center of the #3 cylinder, which is controlled to the first compression ratio according to the command signal from the ECU 100 to the variable-length connecting rod 6, is larger than a predetermined torque difference ΔTR2 between torques around the crankshaft before and after the compression top dead center of the #4 cylinder, which is a failed cylinder and is fixed to the second compression ratio. This is because in the case of the mechanical compression ratio being the first compression ratio, the cylinder pressure in the compression and expansion strokes becomes higher than in the case of the mechanical compression ratio being the second compression ratio, as shown in above-mentioned FIG. 7. Then, a variation in the engine rotational speed as shown in the lower portion of FIG. 8 occurs resulting from such a torque variation. For example, when focusing on a predetermined period of time Δt including the compression top dead center, the torques around the crankshaft, which produce the above-mentioned torque differences ΔTR1 and ΔTR2, respectively, become zero at the compression top dead center, and their directions are reversed before and after the compression top dead center, so that a variation in the engine rotational speed accordingly occurs, as shown in the lower portion of FIG. 8. At this time, assuming that a rotational speed difference between an engine rotational speed in the vicinity of 30 degrees before the compression top dead center of the #3 cylinder, which is controlled to the first compression ratio, and an engine rotational speed in the vicinity of the compression top dead center thereof is ΔNE1, and that a rotational speed difference between an engine rotational speed in the vicinity of 30 degrees before the compression top dead center of the #4 cylinder, which is a failed cylinder and is fixed to the second compression ratio, and an engine rotational speed in the vicinity of the compression top dead center thereof is ΔNE2, ΔNE1 becomes larger than ΔNE2. In addition, assuming that a rotational speed difference between an engine rotational speed in the vicinity of 30 degrees after the compression top dead center of the #3 cylinder, which is controlled to the first compression ratio, and an engine rotational speed in the vicinity of the compression top dead center thereof is ΔNE1', and that a rotational speed difference between an engine rotational speed in the vicinity of 30 degrees after the compression top dead center of the #4 cylinder, which is a failed cylinder and is fixed to the second compression ratio, and an engine rotational speed in the vicinity of the compression top dead center thereof is ΔNE2', ΔNE1' becomes larger than ΔNE2'. That is, ΔNE1 (or ΔNE1'), which is the above-mentioned rotational speed difference in the cylinder in which the mechanical compression ratio is adjusted to the first compression ratio which is the predetermined high compression ratio, becomes larger than ΔNE2 (or ΔNE2'), which is the above-mentioned rotational speed difference in the cylinder in which the mechanical compression ratio is adjusted to the second compression ratio which is the predetermined low compression ratio.

Then, as mentioned above, the influence of the mechanical compression ratio with respect to the rotational speed difference will clearly appear by focusing on the rotational speed difference between the engine rotational speed in the vicinity of 30 degrees before the compression top dead center (or in the vicinity of 30 degrees after the compression top dead center) and the engine rotational speed in the vicinity of the compression top dead center. In other words, when the predetermined crank angle before or after the compression top dead center, which defines the above-mentioned predetermined rotational speed difference, is set in the vicinity of 30 degrees before the compression top dead center or in the vicinity of 30 degrees after the compression top dead center, it can be determined based on the above-mentioned predetermined rotational speed difference whether abnormality has occurred in the mechanical compression ratio. However, there is no intention to limit the predetermined crank angle in the present disclosure to the above-mentioned crank angle, and the predetermined crank angle in the present disclosure need only be a crank angle at which the influence of the mechanical compression ratio with respect to the rotational speed difference can appear.

Here, a flow for abnormality diagnosis of the variable-length connecting rod 6 carried out by the ECU 100 will be explained based on FIG. 9. FIG. 9 is a flow chart showing a flow (or control routine) which is carried out by the ECU 100. In this embodiment, this flow is repeatedly carried out in a predetermined operation period during the operation of the internal combustion engine 1. Here, note that the ECU 100 functions as an abnormality diagnostic device for a variable compression ratio mechanism according to the present disclosure, by carrying out this flow.

In this flow, first, in step S101, it is determined whether fuel cut processing is being carried out. As mentioned above, when the fuel cut processing is carried out, the influence of the combustion state will be eliminated and the mechanical compression ratio of each cylinder 2 of the internal combustion engine 1 will have correlation with the predetermined rotational speed difference, and hence, if the fuel cut processing is being carried out, it can be determined based on the predetermined rotational speed difference whether abnormality has occurred in the mechanical compression ratio. Accordingly, when an affirmative determination is made in step S101, the ECU 100 goes to the processing of step S102 in order to carry out abnormality diagnosis of the variable-length connecting rod 6. On the other hand, when a negative determination is made in step S101, abnormality diagnosis of the variable-length connecting rod 6 can not be carried out, so the execution of this flow is terminated.

When an affirmative determination is made in step S101, in step S102, the engine rotational speed NE is obtained. In step S102, the engine rotational speed NE is detected by the crank position sensor 202 at each crank angle of 30 degrees. In addition, the detection timing of the engine rotational speed NE by the crank position sensor 202 is set to a timing at which the engine rotational speed can be obtained at a crank angle in the vicinity of the compression top dead center of each cylinder 2.

Subsequently, in step S103, it is determined whether the engine rotational speed for one cycle has been obtained. When an affirmative determination is made in step S103, the ECU 100 goes to the processing of step S104. On the other hand, when a negative determination is made in step S103, the ECU 100 returns to step S102.

When an affirmative determination is made in step S103, in step S104, an amount of intake air Gair is calculated. The amount of intake air Gair is an amount of air to be sucked into each cylinder 2 at the intake stroke thereof, and in other words, is an amount of air in each cylinder 2 at the time of closing of the intake valve 9 in the cylinder 2. In step S104, the amount of intake air Gair is calculated based on the intake manifold pressure obtained by the intake manifold pressure sensor 404 and the correlation among the intake manifold pressure and the amount of intake air Gair which have been stored in advance in a ROM of the ECU 100 as a map or a function. In addition, in cases where the internal combustion engine 1 is not provided with the intake manifold pressure sensor 404, the intake manifold pressure is estimated by a well-known technique (e.g., the intake manifold pressure is estimated from a supercharging pressure, in cases where the internal combustion engine 1 is provided with a supercharger), and the amount of intake air Gair is calculated based on the intake manifold pressure thus estimated and the above-mentioned correlation. Here, if there is a fear that the amount of air sucked into each cylinder 2 may vary cylinder to cylinder, the amount of intake air Gair representing the amount of air for each cylinder is calculated in step S104. For example, at this time, an average value of the amount of air for each cylinder is calculated as the amount of intake air Gair. Moreover, during the execution of the fuel cut processing, the degree of opening of the throttle valve 402 is made substantially constant, so the amount of intake air Gair calculated in step S104 can be assumed as the amount of intake air Gair at each detection timing of the engine rotational speed NE in step S102.

Subsequently, in step S105, a command compression ratio setε supplied to the variable-length connecting rod 6 from the ECU 100 is obtained. The ECU 100 supplies a command signal to the variable-length connecting rod 6 so that the mechanical compression ratio of each cylinder 2 is adjusted to the first compression ratio or the second compression ratio. In step S105, the command compression ratio setε is obtained based on such a command signal from the ECU 100 to the variable-length connecting rod 6. Here, note that in this embodiment, the ECU 100 supplies the command signal to the variable-length connecting rod 6 so that the mechanical compression ratio is unified for all the cylinders of the cylinder group with which the internal combustion engine 1 is provided. With this, the variation of torque among the cylinders is suppressed.

Then, in step S106, a reference value ΔNEth of the predetermined rotational speed difference is calculated. In step S106, the reference value ΔNEth is calculated based on the amount of intake air Gair calculated in step S104 and the command compression ratio setε obtained in step S105. As mentioned above, the predetermined rotational speed difference has correlation with the mechanical compression ratio. In addition, the amount of intake air has correlation with the cylinder pressure, as shown in the above-mentioned expression 1, and hence, the predetermined rotational speed difference also has correlation with the amount of intake air. Here, FIG. 10 shows a comparison between when the amount of intake air is large, and when it is small, in the change over time of the engine rotational speed shown in the above-mentioned FIG. 8. As shown in FIG. 10, ΔNE1, which indicates the predetermined rotational speed difference in the case of the amount of intake air being large in the #3 cylinder in which abnormality does not occur in the variable-length connecting rod 6, and in which the mechanical compression ratio is controlled to the first compression ratio according to the command signal from the ECU 100, becomes larger than ΔNE11 which indicates the predetermined rotational speed difference in the case of the amount of intake air being small. Thus, even if abnormality does not occur in the variable-length connecting rod 6 but the mechanical compression ratio is controlled to the same, the predetermined rotational speed difference will change with the amount of intake air.

Here, when the variable-length connecting rod 6 is normal, the mechanical compression ratios of all the cylinders will be controlled to the command compression ratio setε based on the command signal from the ECU 100 to the variable-length connecting rod 6. Then, in this embodiment, because the reference value ΔNEth of the predetermined rotational speed difference is defined as the predetermined rotational speed difference in the case of the variable-length connecting rod 6 being normal, the reference value ΔNEth is defined as a function of the command compression ratio setε in step S106. Moreover, in step S106, the reference value ΔNEth is also defined as a function of the amount of intake air Gair, whereby the influence of the amount of intake air can be eliminated in the processing of step S111 to be described later. In other words, in the processing of step S111 to be described later, it becomes possible to determine the influence of the mechanical compression ratio with respect to the predetermined rotational speed difference. Here, note that the correlation among the reference value ΔNEth, the amount of intake air Gair and the command compression ratio setε has been stored in advance in the ROM of the ECU 100 as a map or a function, and in step S106, the reference value ΔNEth is calculated using this map or function.

Subsequently, in step S107, a lower limit value ΔNEthmin of a reference range and an upper limit value ΔNEthmax of the reference range are calculated. Here, the reference range is set based on the reference value ΔNEth calculated in step S106 by taking a predetermined variation into consideration, and the lower limit value and the upper limit value thereof are defined as ΔNEthmin and ΔNEthmax, respectively. Then, the above-mentioned predetermined variation results, for example, from dimensional tolerances of the component parts of the internal combustion engine 1, etc. In step S107, for example, when assuming that the mechanical compression ratio varies by ±0.5 resulting from dimensional tolerances of the component parts of the internal combustion engine 1, the lower limit value ΔNEthmin of the reference range and the upper limit value ΔNEthmax of the reference range are calculated by converting this variation in the mechanical compression ratio into the predetermined rotational speed difference. Here, note that the ECU 100 also functions as the controller according to the present disclosure by carrying out the processing of steps S104 through S107.

Then, in step S108, a count n for the cylinder 2 for which abnormality diagnosis of the variable-length connecting rod 6 is carried out among the cylinder group with which the internal combustion engine 1 is provided is initialized to 0, and in step S109, 1 is added to the current count n. Hereinafter, in the case of n=1, the #1 cylinder is represented, and similarly, in the case of n=2, 3, and 4, the #2 cylinder, the #3 cylinder and the #4 cylinder are represented, respectively. Then, the processing of steps S110 through S113 is first carried out on the #1 cylinder, and is subsequently carried out on the #2 cylinder, the #3 cylinder, and the #4 cylinder successively in this order.

Subsequently, a predetermined rotational speed difference ΔNE(n) is calculated in step S110. In step S110, the predetermined rotational speed difference ΔNE(n) is calculated based on the engine rotational speed NE obtained in step S102. Specifically, the predetermined rotational speed difference ΔNE(n) is calculated as a rotational speed difference between an engine rotational speed NE at a predetermined crank angle before or after the compression top dead center, and an engine rotational speed NE in the vicinity of the compression top dead center. Here, the predetermined crank angle is, for example, in the vicinity of 30 degrees before the compression top dead center or in the vicinity of 30 degrees after the compression top dead center. Here, note that ΔNE(1) in the case of n=1 represents a predetermined rotational speed difference with respect to the #1 cylinder, and similarly, ΔNE(2), ΔNE(3) and ΔNE(4) represent predetermined rotational speed differences with respect to the #2 cylinder, the #3 cylinder and the #4 cylinder, respectively. Also, note that the ECU 100 also functions as the controller according to the present disclosure by carrying out the processing of step S110.

Thereafter, in step S111, it is determined whether the predetermined rotational speed difference ΔNE(n) calculated in step S110 is equal to or more than the lower limit value ΔNEthmin of the reference range calculated in step S107, and at the same time is equal to or less than the upper limit value ΔNEthmax of the reference range. In step S111, as mentioned above, the influence of the mechanical compression ratio with respect to the predetermined rotational speed difference ΔNE(n) will be substantially determined. When an affirmative determination is made in step S111 (i.e., in this case, when the predetermined rotational speed difference ΔNE(n) is within the above-mentioned reference range), the ECU 100 goes to the processing of step S112. On the other hand, when a negative determination is made in step S111 (i.e., in this case, when the predetermined rotational speed difference ΔNE(n) is out of the above-mentioned reference range), the ECU 100 goes to the processing of step S113.

When an affirmative determination is made in step S111, in step S112, an abnormality determination flag flag(n) is set to 0. On the other hand, when a negative determination is made in step S111, in step S113, the abnormality determination flag flag(n) is set to 1. Here, the abnormality determination flag flag(n) is a flag which is used to determine whether abnormality has occurred in the variable-length connecting rod 6, and in the case of flag(n)=1, a determination is made that abnormality has occurred in the variable-length connecting rod 6. In other words, when a negative determination is made in step S111, i.e., when the predetermined rotational speed difference ΔNE(n) is out of the above-mentioned reference range, a determination is made that abnormality has occurred in the variable-length connecting rod 6. For example, in the case of flag(4)=1 when n=4, a determination is made that abnormality has occurred in the variable-length connecting rod 6 for the #4 cylinder.

When a determination is made in step S113 that abnormality has occurred in the variable-length connecting rod 6 of a specific cylinder 2, the mechanical compression ratio of this cylinder 2 can be further diagnosed. Specifically, when the predetermined rotational speed difference ΔNE(n) calculated in step S110 is smaller than the lower limit value ΔNEthmin of the reference range calculated in step S107, despite that the command compression ratio setε obtained in step S105 becomes the first compression ratio, it can be diagnosed that the variable-length connecting rod 6 of this cylinder 2 is fixed to the second compression ratio. In addition, when the predetermined rotational speed difference ΔNE(n) calculated in step S110 is larger than the upper limit value ΔNEthmax of the reference range calculated in step S107, despite that the command compression ratio sets obtained in step S105 becomes the second compression ratio, it can be diagnosed that the variable-length connecting rod 6 of this cylinder 2 is fixed to the first compression ratio. The variable-length connecting rod 6 of this embodiment changes the mechanical compression ratio of each cylinder 2 to either one of the first compression ratio and the second compression ratio, and the predetermined rotational speed difference ΔNE(n) becomes larger when the mechanical compression ratio is high than when it is low, as a result of which the fact that the predetermined rotational speed difference ΔNE (n) is smaller than the lower limit value ΔNEthmin of the reference range, despite that the command compression ratio sets becomes the first compression ratio, means that the mechanical compression ratio of this cylinder 2 is smaller than the first compression ratio; in other words, the variable-length connecting rod 6 of this cylinder 2 is fixed to the second compression ratio. Moreover, the fact that the predetermined rotational speed difference ΔNE (n) is larger than the upper limit value ΔNEthmax of the reference range, despite that the command compression ratio sets becomes the second compression ratio, means that the mechanical compression ratio of this cylinder 2 is larger than the second compression ratio; in other words, the variable-length connecting rod 6 of this cylinder 2 is fixed to the first compression ratio. Here, note that the ECU 100 also functions as the controller according to the present disclosure by carrying out the processing of steps S111 through S113.

Subsequently, in step S114, it is determined whether n is equal to 4 (n=4). The internal combustion engine 1 in this embodiment is provided with the cylinder group including the four cylinders 2, and hence, in the case of n=4, it means that abnormality diagnosis of the variable-length connecting rod 6 has been completed for all the cylinders. When an affirmative determination is made in step S114, the execution of this flow is ended. On the other hand, when a negative determination is made in step S114, the ECU 100 returns to step S109.

For example, in the case where the mechanical compression ratio of each cylinder 2 is changed from the second compression ratio to the first compression ratio by the variable-length connecting rod 6 according to the command signal from the ECU 100 during the execution of the fuel cut processing, when such a control flow is carried out after the completion of the change of the mechanical compression ratio, it can be diagnosed whether the variable-length connecting rod 6 for each cylinder 2 is not fixed to the second compression ratio. In general, the engine load at the time of returning from the fuel cut processing is small, so the mechanical compression ratio at the time of returning tends to be controlled to the first compression ratio. Then, in the variable-length connecting rod 6 of this embodiment, the higher the engine rotational speed, the more quickly the change of the mechanical compression ratio can be completed, and hence, in cases where the mechanical compression ratio of each cylinder 2 is controlled to the second compression ratio when a condition of execution of the fuel cut processing is satisfied, the ECU 100 tends to start changing the mechanical compression ratio from the second compression ratio to the first compression ratio before or immediately after the fuel cut processing is carried out. And, when the above-mentioned change of the mechanical compression ratio is completed during the execution of the fuel cut processing, the above-mentioned control flow is carried out, and it is diagnosed whether the variable-length connecting rod 6 for each cylinder 2 is not fixed to the second compression ratio. Thus, when abnormality diagnosis of the variable-length connecting rod 6 according to this embodiment is carried out at the time when the change of the mechanical compression ratio by the variable-length connecting rod 6 is not actually carried out, there is a tendency for the abnormality diagnosis to be carried out with relatively good accuracy. Here, note that the above-mentioned is just an example, but there is no intention to limit the abnormality diagnosis of the variable-length connecting rod 6 to the above example. For example, when abnormality diagnosis of the variable-length connecting rod 6 is carried out in the case where the variable-length connecting rod 6 is controlled according to the command signal from the ECU 100 so that the mechanical compression ratio of each cylinder 2 becomes the second compression ratio, it can be diagnosed whether the variable-length connecting rod 6 for each cylinder 2 is not fixed to the first compression ratio.

By the ECU 100 according to this embodiment executing the above-mentioned control flow, it becomes possible to carry out abnormality diagnosis of each variable-length connecting rod 6, without adding any special hardware configuration for estimating a mechanical compression ratio. In addition, when the above-mentioned control flow is executed, a failed cylinder in which an abnormal state has occurred in its variable-length connecting rod 6 can be specified, and further, the mechanical compression ratio of the failed cylinder can be diagnosed. When it is diagnosed that the variable-length connecting rod 6 of the failed cylinder 2 is fixed to the second compression ratio, for example, by controlling a variable-length connecting rod 6 mounted on another cylinder 2 to the second compression ratio by another method or technique, or when it is diagnosed that the variable-length connecting rod 6 of the failed cylinder 2 is fixed to the first compression ratio, for example, by controlling a variable-length connecting rod 6 mounted on another cylinder 2 to the first compression ratio by another method or technique, the variation of torque among the cylinders resulting from the filed cylinder can be suppressed as much as possible.

First Modification

In the following, a first modification of the present disclosure will be explained. The internal combustion engine 1 according to the above-mentioned first embodiment is provided with a variable-length connecting rod 6 which can switch the mechanical compression ratio of each cylinder 2 to either one of the first compression ratio and the second compression ratio. In contrast to this, the internal combustion engine 1 according to this modification is provided with a variable-length connecting rod 6 which can switch the mechanical compression ratio of each cylinder 2 to any of the first compression ratio, the second compression ratio, and a predetermined compression ratio between the first compression ratio and the second compression ratio. As a structure of such a variable-length connecting rod 6, there is mentioned a variable compression ratio mechanism disclosed in the aforementioned patent literature 3, for example. However, in this first modification, there is no intention to limit the structure of the variable-length connecting rod 6 to the variable compression ratio mechanism exemplified in this patent literature, but a variable compression ratio mechanism having another structure may be available.

In this first modification, too, when a specific cylinder among a cylinder group with which the internal combustion engine 1 is provided becomes a failed cylinder for which an abnormal state has occurred in its variable-length connecting rod 6, suitable adjustment of the mechanical compression ratio of the failed cylinder according to the operating state of the internal combustion engine 1 will become difficult. In addition, the mechanical compression ratio of the failed cylinder can be made different from the mechanical compression ratios of the other cylinders, so the variation of torque among the cylinders becomes remarkable, and this is not desirable. Accordingly, similar to the above-mentioned first embodiment, the ECU 100 according to this first modification calculates a predetermined rotational speed difference for each cylinder 2 at the time of carrying out fuel cut processing. Then, the ECU 100 performs an abnormality diagnosis of the variable-length connecting rod 6 based on the predetermined rotational speed difference thus calculated. Here, note that in this first modification, the detailed explanation of substantially the same construction and substantially the same control processing as in the above-mentioned first embodiment is omitted.

Here, the abnormality diagnosis of a variable-length connecting rod 6 carried out by the ECU 100 according to this first modification will be explained based on the above-mentioned FIG. 9. The ECU 100 according to this first modification supplies a command signal to the variable-length connecting rod 6 so that the mechanical compression ratio of each cylinder 2 is adjusted to the first compression ratio or the second compression ratio or the predetermined compression ratio between the first and second compression ratios. Then, after the processing of step S104, in step S105, the ECU 100 obtains a command compression ratio set ε based on such a command signal to the variable-length connecting rod 6. The control flow of this modification goes to the processing of step S106, after the processing of step S105.

In addition, after the processing of step S111, in step S112, the ECU 100 sets the abnormality determination flag flag(n) to 0 for a cylinder 2 in which the predetermined rotational speed difference ΔNE(n) is within the reference range, and determines that abnormality has not occurred in the variable-length connecting rod 6 of this cylinder. On the other hand, after the processing of step S111, in step S113, the ECU 100 sets the abnormality determination flag flag(n) to 1 for a cylinder 2 in which the predetermined rotational speed difference ΔNE(n) is out of the reference range, and determines that abnormality has occurred in the variable-length connecting rod 6 of this cylinder. Then, the control flow goes to the processing of step S114, after the processing of step S112 or S113.

By the ECU 100 according to this modification executing the above-mentioned control flow, too, it becomes possible to carry out abnormality diagnosis of each variable-length connecting rod 6, without adding any special hardware configuration for estimating a mechanical compression ratio. In addition, when the above-mentioned control flow is executed, a failed cylinder in which an abnormal state has occurred in its variable-length connecting rod 6 can be specified.

Second Modification

In the following, a second modification of the present disclosure will be explained. The internal combustion engines 1 according to the first embodiment and the first modification mentioned above are each provided with the variable-length connecting rods 6 which can change mechanical compression ratios for the individual cylinders 2, respectively, from their structure. In contrast to this, a variable compression ratio mechanism with which the internal combustion engine 1 according to this second modification is provided may be a variable compression ratio mechanism which changes, at the same time, mechanical compression ratios for all the cylinders of a cylinder group with which the internal combustion engine 1 is provided, from a structural point of view. As a structure of such a variable compression ratio mechanism, there is mentioned a multi-link type piston-crank mechanism disclosed in the aforementioned patent literature 1, for example. However, in this second modification, there is no intention to limit the structure of the variable compression ratio mechanism thereof to the variable compression ratio mechanism exemplified in this patent literature, but a variable compression ratio mechanism having another structure may be available. Here, note that in this second modification, the detailed explanation of substantially the same construction and substantially the same control processing as in the above-mentioned first embodiment is omitted.

Here, an abnormality diagnosis of a variable compression ratio mechanism carried out by the ECU 100 according to this second modification will be explained based on the above-mentioned FIG. 9 and FIG. 11. FIG. 11 is a flow chart showing a flow (or control routine) of abnormality diagnosis of a variable compression ratio mechanism, which is carried out by the ECU 100. In this second modification, substantially, an object of abnormality diagnosis is a cylinder group with which the internal combustion engine 1 is provided, and in FIG. 11, the step S108 and subsequent ones shown in the above-mentioned FIG. 9 are replaced with a case where n=1.

The ECU 100 according to this second modification calculates a predetermined rotational speed difference ΔNE in step S201, after the processing of step S107. In step S201, the predetermined rotational speed difference ΔNE is calculated based on the engine rotational speed NE obtained in step S102. Specifically, the predetermined rotational speed difference ΔNE is calculated as a rotational speed difference between an engine rotational speed NE at a predetermined crank angle before or after the compression top dead center, and an engine rotational speed NE in the vicinity of the compression top dead center, for a predetermined cylinder 2 among the cylinder group with which the internal combustion engine 1 is provided.

Thereafter, in step S202, it is determined whether the predetermined rotational speed difference ΔNE calculated in step S201 is equal to or more than the lower limit value ΔNEthmin of the reference range calculated in step S107, and at the same time is equal to or less than the upper limit value ΔNEthmax of the reference range. When an affirmative determination is made in step S202 (i.e., in this case, when the predetermined rotational speed difference ΔNE is within the above-mentioned reference range), the ECU 100 goes to the processing of step S203. On the other hand, when a negative determination is made in step S202 (i.e., in this case, when the predetermined rotational speed difference ΔNE is out of the above-mentioned reference range), the ECU 100 goes to the processing of step S204.

When an affirmative determination is made in step S202, in step S203, an abnormality determination flag "flag" is set to 0. On the other hand, when a negative determination is made in step S202, in step S204, the abnormality determination flag "flag" is set to 1. Here, the abnormality determination flag "flag" is a flag which is used to determine whether abnormality has occurred in the variable compression ratio mechanism according to this second modification, and in the case of "flag"=1, a determination is made that abnormality has occurred in the variable compression ratio mechanism. In other words, when a negative determination is made in step S202, i.e., when the predetermined rotational speed difference ΔNE is out of the above-mentioned reference range, a determination is made that abnormality has occurred in the variable compression ratio mechanism. Then, after the processing of step S203, or after the processing of step S204, the execution of this flow is ended.

By the ECU 100 according to this second modification executing the above-mentioned control flow, too, it becomes possible to carry out abnormality diagnosis of the variable compression ratio mechanism, without adding any special hardware configuration for estimating a mechanical compression ratio.

Second Embodiment

Next, reference will be made to a second embodiment of the present disclosure based on FIGS. 12 and 13. Similar to the above-mentioned first modification, an internal combustion engine 1 according to this second embodiment is provided with variable-length connecting rods 6, each of which can switch the mechanical compression ratio of each cylinder 2 to any of the first compression ratio, the second compression ratio, and a predetermined compression ratio between the first compression ratio and the second compression ratio. Here, note that in this second embodiment, the detailed explanation of substantially the same construction and substantially the same control processing as in the above-mentioned first embodiment is omitted.

In the above-mentioned first embodiment, abnormality diagnosis of a variable-length connecting rod 6 is carried out by calculating a predetermined rotational speed difference for each cylinder 2 at the time of fuel cut processing being carried out, and then by determining whether the predetermined rotational speed difference falls within a reference range which is decided based on a reference value, which is calculated based on an amount of intake air and a command signal from the ECU 100 to the variable-length connecting rod 6, taking a predetermined variation into consideration. In contrast to this, in this second embodiment, the ECU 100 estimates an actual mechanical compression ratio of each cylinder 2 (hereinafter, sometimes referred to simply as an "actual mechanical compression ratio") based on an amount of intake air and a predetermined rotational speed difference at the time of carrying out fuel cut processing. Then, abnormality diagnosis of a variable-length connecting rod 6 is carried out by determining whether the actual mechanical compression ratio thus estimated falls within a reference range of a command compression ratio, which is decided based on the command compression ratio taking into consideration a predetermined compression ratio variation.

Here, the estimation of the actual mechanical compression ratio of each cylinder 2 carried out by the ECU 100 in this second embodiment will be explained based on FIG. 12. FIG. 12 is a graph explaining influences which mechanical compression ratios have on the correlation between the amount of intake air and the predetermined rotational speed difference. In FIG. 12, there are shown correlations between the amount of intake air and the predetermined rotational speed difference in the case where the mechanical compression ratios are a first compression ratio, the second compression ratio, and the predetermined compression ratio between the first compression ratio and the second compression sion ratio, respectively. Here, note that FIG. 12 shows these correlations at the time of carrying out fuel cut processing. As shown in FIG. 12, when the mechanical compression ratios are each the same, the larger the amount of intake air, the larger the predetermined rotational speed difference becomes. This corresponds to the fact that in the change over time of the engine rotational speed shown in the above-mentioned FIG. 10, ΔNE1 indicating the predetermined rotational speed difference in the case of the amount of intake air being large becomes larger than ΔNE11 indicating the predetermined rotational speed difference in the case of the amount of intake air being small. In addition, as shown in FIG. 12, when the amount of intake air is the same, the predetermined rotational speed difference in a line L1 indicating the above-mentioned correlation in the case of the mechanical compression ratio being the first compression ratio is become large than the predetermined rotational speed difference in a line L2 indicating the above-mentioned correlation in the case of the mechanical compression ratio being the second compression ratio. This corresponds to the fact that in the change over time of the engine rotational speed shown in the above-mentioned FIG. 8, ΔNE1 (ΔNE1') indicating the predetermined rotational speed difference of a cylinder in which the mechanical compression ratio is the first compression ratio becomes larger than ΔNE2 (ΔNE2') indicating the predetermined rotational speed difference of a cylinder in which the mechanical compression ratio is the second compression ratio.

Then, the ECU 100 can estimate the actual mechanical compression ratio of each cylinder 2 by deciding the correlations shown in FIG. 12 in advance through experiments, etc., and storing them in the ROM of the ECU 100. Specifically, the ECU 100 can calculate an amount of intake air and a predetermined rotational speed difference at the time of carrying out fuel cut processing, and can estimate an actual mechanical compression ratio of each cylinder 2 based on these calculated values and the above-mentioned correlations. Then, based on FIG. 12, it is estimated that in the case where the amount of intake air is the same, the actual mechanical compression ratio is estimated to be higher when the predetermined rotational speed difference is large than when it is small. Here, note that the ECU 100 also functions as the controller according to the present disclosure, by estimating the actual mechanical compression ratio in this manner.

Further, in FIG. 12, attention is focused on the case where the amount of intake air is constant at Gair. In FIG. 12, points (point P1 through point P4) representing predetermined rotational speed differences in the case of the amount of intake air being Gair are shown together for the individual cylinders 2 (#1 cylinder through #4 cylinder). Here, note that at this time, the ECU 100 supplies a command signal to each variable-length connecting rod 6 so that the mechanical compression ratio of each cylinder 2 is adjusted to a predetermined compression ratio indicated by a line L3 in FIG. 12. That is, at this time, a command compression ratio is the predetermined compression ratio indicated by the line L3. Here, a hatching region in FIG. 12 forms a fixed range with respect to the line L3, and in cases where a point defined by an amount of intake air and a predetermined rotational speed difference at the time when the ECU 100 supplies the above-mentioned command signal falls within the hatching region, it is assumed that the mechanical compression ratio is normally controlled according to the command signal from the ECU 100. As mentioned above, the mechanical compression ratio may vary resulting from dimensional tolerances of the component parts of the internal combustion engine 1. Then, it can be said that the above-mentioned hatching region takes such variation into consideration.

As shown in FIG. 12, the point P1, the point P2 and the point P3 representing the predetermined rotational speed differences of the #1 cylinder, the #2 cylinder and the #3 cylinder, respectively, in the case of the amount of intake air being Gair fall within the above-mentioned hatching region. On the other hand, the point P4 representing the predetermined rotational speed difference of the #4 cylinder in the case of the amount of intake air being Gair is out of the above-mentioned hatching region. In other words, it can be decided that the mechanical compression ratio of the #4 cylinder is not controlled normally. In addition, at this time, the predetermined rotational speed difference ΔNE(4) in the #4 cylinder is smaller than each of the predetermined rotational speed differences ΔNE(1), ΔNE(2) and ΔNE(3) in the #1 cylinder, the #2 cylinder and the #3 cylinder, and hence, the actual mechanical compression ratio of the #4 cylinder is smaller than each of the actual mechanical compression ratios of the #1 cylinder, the #2 cylinder and the #3 cylinder.

Here, the abnormality diagnosis of each variable-length connecting rod 6 carried out by the ECU 100 according to this second embodiment will be explained based on the above-mentioned FIG. 9 and FIG. 13. FIG. 13 is a flow chart showing a flow (or control routine) of the abnormality diagnosis of each variable-length connecting rod 6 carried out by the ECU 100. Here, note that the ECU 100 functions as an abnormality diagnostic device for a variable compression ratio mechanism according to the present disclosure, by carrying out the flows shown in the above mentioned FIG. 9 and FIG. 13. The ECU 100 according to this second embodiment supplies a command signal to each variable-length connecting rod 6 so that the mechanical compression ratio of each cylinder 2 is adjusted to the first compression ratio or the second compression ratio or the predetermined compression ratio between the first and second compression ratios. Then, after the processing of step S104, in step S105 shown in the above mentioned FIG. 9, the ECU 100 obtains a command compression ratio setε based on such a command signal to each variable-length connecting rod 6.

In addition, in step S301, after the processing of step S105, the ECU 100 calculates a lower limit value setεmin of the reference range of the command compression ratio, and an upper limit value setεmax of the reference range of the command compression ratio. Here, the reference range of the command compression ratio is set based on the command compression ratio setε obtained in step S105 by taking a predetermined compression ratio variation into consideration, and the lower limit value and the upper limit value thereof are defined as setεmin and setεmax, respectively. Then, the above-mentioned predetermined compression ratio variation results, for example, from dimensional tolerances of the component parts of the internal combustion engine 1, etc., and corresponds to the hatching region shown in the above-mentioned FIG. 12. In step S301, for example, assuming that the mechanical compression ratio varies by ±0.5 resulting from dimensional tolerances of the component parts of the internal combustion engine 1, the lower limit value setεmin and the upper limit value setεmax of the reference range of the command compression ratio are calculated. Then, the control flow of this second embodiment goes to the processing of step S108, after the processing of step S301. Here, note that the ECU 100 also functions as the controller according to the present disclosure by carrying out the processing of step S105 to obtain the command compression ratio setε, and by carrying out the processing of step S301.

In addition, the ECU 100 calculates an actual mechanical compression ratio ε(n) in step S302, after the processing of step S110. In step S302, the actual mechanical compression ratio ε(n) is calculated based on the amount of intake air Gair calculated in step S104 and the predetermined rotational speed difference ΔNE(n) calculated in step S110. As mentioned above, when the relation among the mechanical compression ratio, the amount of intake air and the predetermined rotational speed difference are decided in advance through experiments, etc., it will become possible to calculate the actual mechanical compression ratio ε(n). Here, note that the ECU 100 also functions as the controller according to the present disclosure by carrying out the processing of step S302.

Thereafter, in step S303, it is determined whether the actual mechanical compression ratio ε(n) calculated in step S302 is equal to or more than the lower limit value setεmin of the reference range of the command compression ratio calculated in step S301, and at the same time is equal to or less than the upper limit value setεmax of the reference range of the command compression ratio. When an affirmative determination is made in step S303 (i.e., in this case, when the actual mechanical compression ratio ε(n) is within the above-mentioned reference range of the command compression ratio), the ECU 100 goes to the processing of step S112. On the other hand, when a negative determination is made in step S303 (i.e., in this case, when the actual mechanical compression ratio ε(n) is out of the above-mentioned reference range of the command compression ratio), the ECU 100 goes to the processing of step S113.

When an affirmative determination is made in step S303, in step S112, an abnormality determination flag flag(n) is set to 0 for a cylinder 2 in which the actual mechanical compression ratio ε(n) is within the reference range of the command compression ratio, and determines that abnormality has not occurred in the variable-length connecting rod 6 of this cylinder. On the other hand, when a negative determination is made in step S303, in step S113, the abnormality determination flag flag(n) is set to 1 for a cylinder 2 in which the actual mechanical compression ratio ε(n) is out of the reference range of the command compression ratio, and determines that abnormality has occurred in the variable-length connecting rod 6 of this cylinder. Then, the control flow goes to the processing of step S114, after the processing of step S112 or S113. Here, note that the ECU 100 also functions as the controller according to the present disclosure by carrying out the processing of steps S303, S112 and S113.

By the ECU 100 according to this second embodiment executing the above-mentioned control flow, it becomes possible to estimate a mechanical compression ratio without adding any special construction, thereby making it possible to carry out abnormality diagnosis of each variable-length connecting rod 6.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An abnormality diagnostic device for a variable compression ratio mechanism adapted to be applied to an internal combustion engine which includes:

a variable compression ratio mechanism that changes a mechanical compression ratio of an internal combustion engine by changing a volume of a combustion chamber; and an engine rotational speed sensor that is configured to obtain an engine rotational speed of said internal combustion engine;

said abnormality diagnostic device comprises a controller comprising at least one processor configured to:

control a change of the mechanical compression ratio by means of said variable compression ratio mechanism by supplying a command signal to said variable compression ratio mechanism;

calculate a predetermined rotational speed difference which is a rotational speed difference between an engine rotational speed at a predetermined crank angle before or after compression top dead center, and an engine rotational speed in the vicinity of the compression top dead center, for a predetermined cylinder of said internal combustion engine at the time of carrying out fuel cut processing in which fuel injection is stopped during operation of said internal combustion engine;

calculate a reference value of said predetermined rotational speed difference based on an amount of intake air of said internal combustion engine, and said command signal supplied by the controller, and set a reference range of said predetermined rotational speed difference by taking account of a predetermined variation for said reference value; and make a diagnosis that abnormality has occurred in said variable compression ratio mechanism, when said predetermined rotational speed difference calculated by the controller is out of said reference range.

2. The abnormality diagnostic device for a variable compression ratio mechanism according to claim 1, wherein said internal combustion engine has a plurality of cylinders;

said variable compression ratio mechanism is mounted on each of said plurality of cylinders;

said controller is further configured to:

control the change of mechanical compression ratios by means of said variable compression ratio mechanisms in such a manner that the mechanical compression ratios become unified for all of said plurality of cylinders;

calculate said predetermined rotational speed difference for each of said plurality of cylinders at the time of carrying out said fuel cut processing; and diagnose, with respect to a cylinder among said plurality of cylinders in which said predetermined rotational speed difference calculated by the controller is out of said reference range, that abnormality has occurred in a variable compression ratio mechanism mounted on said cylinder.

3. The abnormality diagnostic device for a variable compression ratio mechanism according to claim 2, wherein said variable compression ratio mechanism mounted on each of said plurality of cylinders changes the mechanical compression ratio of the corresponding cylinder to either one of a predetermined low compression ratio and a predetermined high compression ratio; and when said command signal is supplied to said variable compression ratio mechanisms from said controller so that the mechanical compression ratios of said plurality of cylinders are adjusted to said predetermined high compression ratio by means of said variable compression ratio mechanisms, said controller diagnoses, with respect to a cylinder in which said predetermined rotational speed difference calculated by the controller is smaller than a lower limit value of said reference range among said plurality of cylinders, that said variable compression ratio mechanism mounted on said cylinder is fixed to said predetermined low compression ratio.

4. The abnormality diagnostic device for a variable compression ratio mechanism according to claim 2, wherein said variable compression ratio mechanism mounted on each of said plurality of cylinders changes the mechanical compression ratio of the corresponding cylinder to either one of a predetermined low compression ratio and a predetermined high compression ratio; and when said command signal is supplied to said variable compression ratio mechanisms from said controller so that the mechanical compression ratios of said plurality of cylinders are adjusted to said predetermined low compression ratio by means of said variable compression ratio mechanisms, said controller diagnoses, with respect to a cylinder in which said predetermined rotational speed difference calculated by the controller is larger than an upper limit value of said reference range among said plurality of cylinders, that said variable compression ratio mechanism mounted on said cylinder is fixed to said predetermined high compression ratio.

5. An abnormality diagnostic device for a variable compression ratio mechanism adapted to be applied to an internal combustion engine which includes:

a variable compression ratio mechanism that changes a mechanical compression ratio of an internal combustion engine by changing a volume of a combustion chamber; and an engine rotational speed sensor that is configured to obtain an engine rotational speed of said internal combustion engine;

said abnormality diagnostic device comprises a controller comprising at least one processor configured to:

control a change of the mechanical compression ratio by means of said variable compression ratio mechanism by supplying a command signal to said variable compression ratio mechanism;

calculate a predetermined rotational speed difference which is a rotational speed difference between an engine rotational speed at a predetermined crank angle before or after compression top dead center, and an engine rotational speed in the vicinity of the compression top dead center, for a predetermined cylinder of said internal combustion engine at the time of carrying out fuel cut processing in which fuel injection is stopped during operation of said internal combustion engine;

obtain a command compression ratio which is a mechanical compression ratio based on said command signal supplied by the controller, and set a reference range of said command compression ratio by taking account of a predetermined compression ratio variation for said command compression ratio;

estimate an actual mechanical compression ratio, which is an actual mechanical compression ratio of said internal combustion engine, based on an amount of intake air of said internal combustion engine, and said predetermined rotational speed difference calculated by the controller, and estimate said actual mechanical compression ratio which is higher when said predetermined rotational speed difference is large than when it is small, in cases where the amount of intake air is the same; and make a diagnosis that abnormality has occurred in said variable compression ratio mechanism, when said actual mechanical compression ratio estimated by the controller is out of the reference range of said command compression ratio.

\* \* \* \* \*